(12) United States Patent
Bruffey et al.

(10) Patent No.: US 11,392,977 B2
(45) Date of Patent: Jul. 19, 2022

(54) ASSET TRACKING SYSTEM AND METHOD OF ENABLING USER COST REDUCTION FOR SUCH ASSETS

(71) Applicant: ACCURENCE, INC., Westminster, CO (US)

(72) Inventors: Timothy Bruffey, Commerce City, CO (US); Jacob Labrie, Broomfield, CO (US)

(73) Assignee: ACCURENCE, INC., Louisville, CO (US)

( * ) Notice: Subject to any disclaimer, the term of this patent is extended or adjusted under 35 U.S.C. 154(b) by 777 days.

(21) Appl. No.: 15/214,877

(22) Filed: Jul. 20, 2016

(65) Prior Publication Data

US 2017/0169459 A1    Jun. 15, 2017

Related U.S. Application Data

(63) Continuation-in-part of application No. 14/968,574, filed on Dec. 14, 2015, now Pat. No. 10,861,099.

(51) Int. Cl.
| | | |
|---|---|---|
| *G06Q 30/00* | (2012.01) | |
| *G06Q 30/02* | (2012.01) | |
| *G06Q 40/08* | (2012.01) | |
| *G06Q 10/06* | (2012.01) | |
| *G06Q 50/16* | (2012.01) | |

(52) U.S. Cl.
CPC ......... *G06Q 30/0234* (2013.01); *G06Q 10/06* (2013.01); *G06Q 10/063* (2013.01); *G06Q 10/063112* (2013.01); *G06Q 30/0201* (2013.01); *G06Q 40/08* (2013.01); *G06Q 50/165* (2013.01)

(58) Field of Classification Search
CPC .... G06Q 10/06; G06Q 30/06; G06Q 30/0605; G06Q 20/387; G06Q 30/0283; G06Q 10/0832; G06Q 30/0681; G06Q 40/00; G06Q 40/08; G06Q 30/0234; G06S 30/027

See application file for complete search history.

(56) References Cited

U.S. PATENT DOCUMENTS

| | | |
|---|---|---|
| 5,189,606 A | 2/1993 | Burns |
| 5,557,515 A | 9/1996 | Abbruzzese et al. |
| 6,037,945 A | 3/2000 | Loveland |

(Continued)

FOREIGN PATENT DOCUMENTS

JP    2005250719    *  9/2005

OTHER PUBLICATIONS

ImproveNet's Two-Stage Pricing Wizard Makes It Easy To Calculate Roofing Costs; Dual Views Offer Tradeoffs Between Speed, Precision Publication info: Business Wire Apr. 25, 2000: 0670.*

(Continued)

*Primary Examiner* — Richard C Weisberger
(74) *Attorney, Agent, or Firm* — Sheridan Ross P.C.

(57) ABSTRACT

A communication system and servers are disclosed. The illustrative communication system is taught to include a user-facing rebate system that has a line item extraction engine, a purchasable quantities engine, and a rebate matching engine that are capable of identifying materials required in an estimate and corresponding applicable rebates or discounts, thereby facilitating the use of rebate and discount programs and benefitting from the attendant cost savings.

20 Claims, 9 Drawing Sheets

(56) References Cited

U.S. PATENT DOCUMENTS

| | | | |
|---|---|---|---|
| 6,810,383 B1 | 10/2004 | Loveland | |
| 6,816,819 B1 | 11/2004 | Loveland | |
| 6,826,539 B2 | 11/2004 | Loveland | |
| 6,829,584 B2 | 12/2004 | Loveland | |
| 6,859,768 B1 | 2/2005 | Wakelam et al. | |
| 7,333,944 B1 | 2/2008 | Harris | |
| 7,389,255 B2 | 6/2008 | Formisano | |
| 7,747,460 B2 | 6/2010 | Vandrilla | |
| 7,844,503 B2 | 11/2010 | Fogelson | |
| 8,078,436 B2 | 12/2011 | Pershing et al. | |
| 8,145,578 B2 | 3/2012 | Pershing et al. | |
| 8,170,840 B2 | 5/2012 | Pershing | |
| 8,209,152 B2 | 6/2012 | Pershing | |
| 8,249,999 B2 | 8/2012 | Dakar et al. | |
| 8,265,963 B1 | 9/2012 | Hanson et al. | |
| 8,401,222 B2 | 3/2013 | Thornberry et al. | |
| 8,670,961 B2 | 3/2014 | Pershing | |
| 8,756,085 B1 | 6/2014 | Plummer et al. | |
| 8,983,806 B2 | 3/2015 | Labrie et al. | |
| 9,158,869 B2 | 10/2015 | Labrie et al. | |
| 9,609,288 B1 | 3/2017 | Richman et al. | |
| 10,204,193 B2 | 2/2019 | Koger et al. | |
| 10,373,256 B1* | 8/2019 | Allen | G06Q 10/10 |
| 10,552,913 B1 | 2/2020 | Brandmaier et al. | |
| 11,210,741 B1* | 12/2021 | Allen | G06Q 40/08 |
| 2002/0087332 A1 | 7/2002 | Como | |
| 2004/0243423 A1 | 12/2004 | Rix et al. | |
| 2005/0102394 A1 | 5/2005 | Loveland | |
| 2009/0216552 A1 | 8/2009 | Watrous | |
| 2009/0234690 A1 | 9/2009 | Nikipelo | |
| 2009/0265193 A1 | 10/2009 | Collins et al. | |
| 2010/0235206 A1* | 9/2010 | Miller | E04D 3/352 705/7.11 |
| 2010/0332355 A1 | 12/2010 | Lopez | |
| 2012/0296774 A1 | 11/2012 | Littooy et al. | |
| 2013/0144715 A1* | 6/2013 | Kranzley | G06Q 30/0251 705/14.49 |
| 2015/0073864 A1 | 3/2015 | Labrie et al. | |
| 2015/0170288 A1 | 6/2015 | Harton et al. | |
| 2015/0227893 A1 | 8/2015 | Huynh et al. | |
| 2015/0348204 A1 | 12/2015 | Danes | |
| 2016/0098802 A1 | 4/2016 | Bruffey et al. | |
| 2016/0307447 A1 | 10/2016 | Johnson et al. | |
| 2017/0132711 A1 | 5/2017 | Bruffey et al. | |
| 2017/0330207 A1 | 11/2017 | Labrie et al. | |
| 2017/0345069 A1 | 11/2017 | Labrie et al. | |

OTHER PUBLICATIONS

Celerant's Retail Software Streamlines Rebate Management with Benjamin Moore™ Alternate Title:CELERANTAuthors:PR NewswireSource:PR Newswire US. Mar. 4, 2020. Document Type:ArticleGeographic Terms:New YorkAbstract: Staten Island, N.Y., Mar. 4, 2020 /PRNewswire-PRWeb/—Celerant Technology.*
U.S. Appl. No. 15/970,484, filed May 3, 2018, Labrie et al..
Final Action for U.S. Appl. No. 14/968,574, dated Aug. 28, 2017, 34 pages.
Official Action for U.S. Appl. No. 14/968,574, dated May 1, 2018, 39 pages.
Official Action for U.S. Appl. No. 15/445,509, dated May 10, 2018, 14 pages.
U.S. Appl. No. 15/445,509 (8222-23), filed Feb. 28, 2017, Labrie.
Notice of Allowance for U.S. Appl. No. 14/540,886, dated Mar. 28, 2017, 10 pages.
Official Action for U.S. Appl. No. 14/968,574, dated Jan. 3, 2017,28 pages.
Notice of Allowance for U.S. Appl. No. 15/445,509, dated Nov. 5, 2018 10 pages.
Official Action for U.S. Appl. No. 13/336,559, dated Apr. 15, 2014, 9 pages.
Notice of Allowance for U.S. Appl. No. 13/336,559, dated Dec. 5, 2014, 8 pages.
Official Action for U.S. Appl. No. 13/542,541, dated May 23, 2014, 10 pages.
Final Action for U.S. Appl. No. 13/542,541, dated Jan. 28, 2015, 11 pages.
Notice of Allowance for U.S. Appl. No. 13/542,541, dated Aug. 5, 2015, 8 pages.
Official Action for U.S. Appl. No. 15/345,071, dated Nov. 3, 2020 13 pages.
Notice of Allowance for U.S. Appl. No. 14/968,574, dated Aug. 5, 2020 9 pages.
Examiners Answer for U.S. Appl. No. 15/606,475, dated Dec. 28, 2020 38 pages.
Official Action for U.S. Appl. No. 15/970,484, dated Dec. 28, 2020 31 pages.
Official Action for U.S. Appl. No. 15/663,518, dated Dec. 20, 2019 12 pages.
Notice of Allowance for U.S. Appl. No. 15/663,518, dated Apr. 8, 2020 8 pages.
Official Action for U.S. Appl. No. 15/345,071, dated Aug. 22, 2019 8 pages.
Official Action for U.S. Appl. No. 15/345,071, dated Apr. 3, 2020 10 pages.
Official Action for U.S. Appl. No. 14/968,574, dated Sep. 19, 2019 41 pages.
Official Action for U.S. Appl. No. 14/968,574, dated Apr. 2, 2020 37 pages.
Official Action for U.S. Appl. No. 16/245,506, dated Nov. 29, 2019 9 pages.
Notice of Allowance for U.S. Appl. No. 16/245,506, dated May 28, 2020 8 pages.
Official Action for U.S. Appl. No. 16/208,113, dated Nov. 18, 2019 10 pages.
Notice of Allowance for U.S. Appl. No. 16/208,113, dated May 5, 2020 11 pages.
Corrected Notice of Allowance for U.S. Appl. No. 16/208,113, dated Jul. 2, 2020 7 pages.
Official Action for U.S. Appl. No. 15/606,475, dated Jan. 6, 2020 30 pages.
Official Action for U.S. Appl. No. 15/606,475, dated Mar. 20, 2020 33 pages.
Official Action for U.S. Appl. No. 15/970,484, dated Mar. 19, 2020 25 pages.
Official Action for U.S. Appl. No. 15/345,071, dated Apr. 15, 2021 12 pages.
Official Action for U.S. Appl. No. 15/970,484, dated Apr. 30, 2021 40 pages.
Final Action for U.S. Appl. No. 14/968,574, dated Feb. 8, 2019, 42 pages.

* cited by examiner

ASSET TRACKING SYSTEM AND METHOD OF ENABLING USER COST REDUCTION FOR SUCH ASSETS

CROSS-REFERENCE TO RELATED APPLICATION

The present application is a continuation-in-part of, and claims priority from, U.S. patent application Ser. No. 14/968,574, filed on Dec. 14, 2015 and entitled "METHOD AND SYSTEM FOR CONVERTING RESOURCE NEEDS TO SERVICE DESCRIPTIONS," which is incorporated herein by reference in its entirety for all purposes.

FIELD OF THE DISCLOSURE

The present disclosure is generally directed to communication systems and, in particular, to communication systems that enable asset tracking and cost reduction for the purchase of such assets.

BACKGROUND

In the insurance property restoration space for wind and hail claims there is waste. Why does the insured have to waste time trying to find a reputable contractor? Why do both the insurance company and the contractor(s) have to inspect the same property, write an estimate, order the aerial imagery reports, access the same price lists, take the same photos, complete similar forms, etc.? As one can imagine there is a lot of duplication which increases the time frame in which the property can be repaired, which may expose the property to secondary damages if the roof or other attributes have been compromised.

At a higher level, each inspector (adjuster and contractor) has to be well-versed in the specific art (e.g., wind damage, hail damage, flood damage, etc.), which takes time and energy representing additional waste. The reality is that contractors maintain a database of simplified pricing minimums based on major components for roof replacement that do not correspond with the insurance industry component pricing model. As such this creates a challenge for contractors as they are not able to maintain the knowledge of the insurance processes and software due to storms occurring every few years. (Many contractors determine that it is just not worth paying for the training and licensing to maintain the knowledge or software corresponding to the insurance industry component pricing model during the lull periods). So when an event hits in that contractor's area, he or she is not able to work well within the insurance workflows and as a result the contractor either performs poorly or partners with a "stormer" (contractor who chases storms), who may or may not have long term responsibilities for the property, the community, or the business with whom he or she partners, thus blurring the lines around licensing, insurance, warranties, payment, customer service, and other key areas. All of these factors may further lead to challenges for the insured, insurance company, and contractor in repairing the home. This leads to homeowners looking towards the carrier for help that is more holistic (rather than just a check).

Along the same vector, as consumers expect better customer service year over year and insurance companies become more competitive with each other, there is a growing demand to provide a more comprehensive solution which extends beyond coverage determination and an indemnity payment. Carriers and insureds are looking for ways to repair the home efficiently after verified damages. Contractors are also looking for ways to participate in a workflow with what is traditionally referred to as Managed Repair.

Additionally, insurance carriers spend hundreds of millions of dollars in materials associated with severity payments to insureds whose homes experience damage each year. One of the first steps in the allocation of money for repair of a damaged property is to obtain an estimate, which may comprise one or more line items and an estimated cost associated with each. Estimate line items may represent bundled assemblies and components (e.g. where a single line item encompasses multiple costs) to simplify the estimating process.

DETAILED DESCRIPTION

Figure 1:
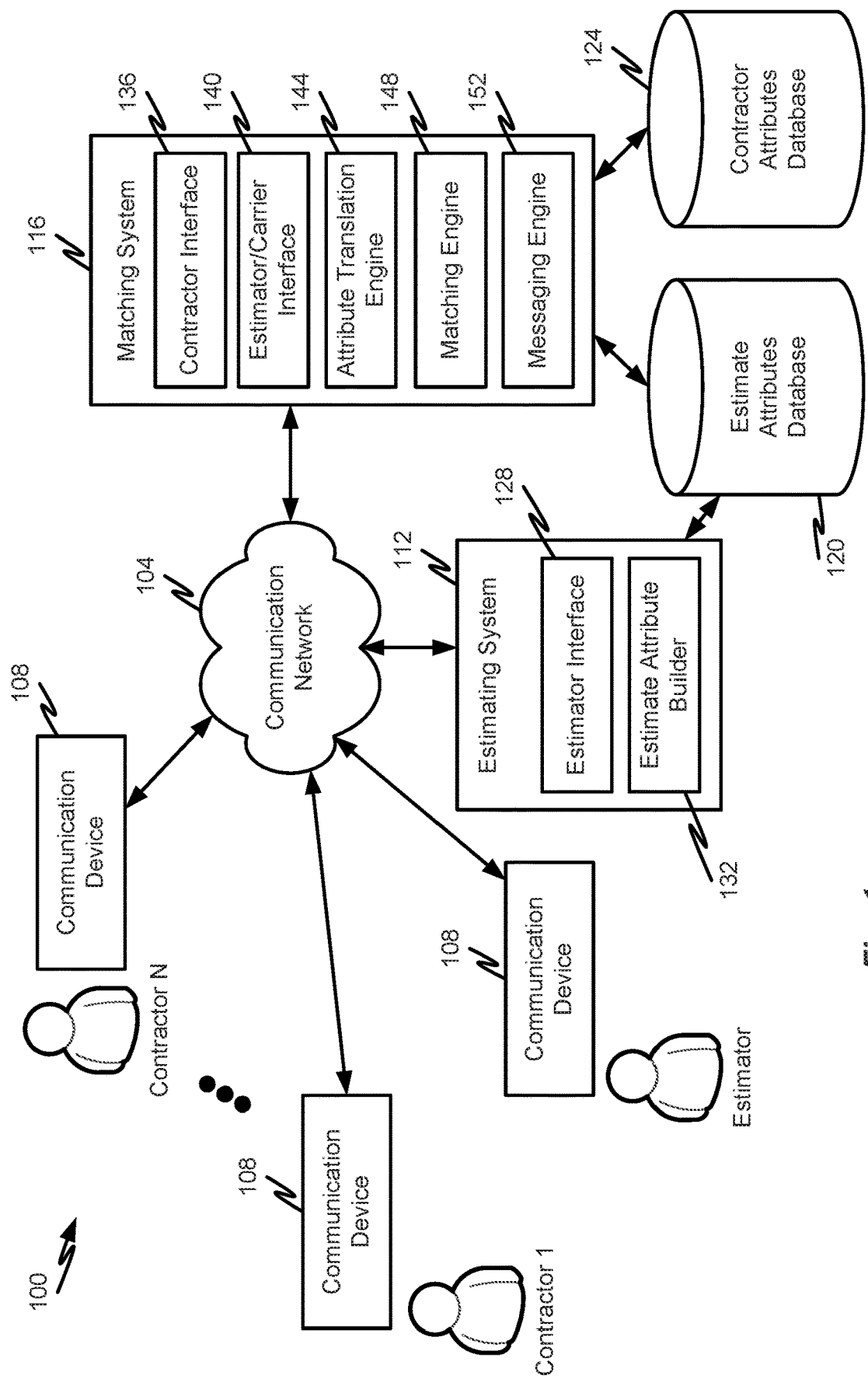
FIG. 1 depicts a block diagram of a communication system in accordance with at least some embodiments of the present disclosure.

Embodiments of the present disclosure will be described in connection with the execution of a matching system. While embodiments of the present disclosure will be described in connection with the matching of a contractor to a job or project, where the job or project corresponds to a job or project to be performed on behalf of an insured, it should be appreciated that embodiments of the present disclosure are not so limited. Indeed, the aspects disclosed herein can apply to any type of data translation and matching process where one of the parties to be matched provides attributes or inputs in a first format, the other of the parties to be matched provides attributes or inputs in a second format, and there is a translation from the first format to the second format, or vice versa, or from the first and second formats to a third-common format, that enables the parties to be matched according to their attributes or inputs. For instance, embodiments of the present disclosure can be applied to any workflow processing environment of any size or complexity. As a more specific, but non-limiting example, the features described herein can be applied to any project assignment process such as a residential construction project, a commercial construction project, a word-processing project, a data-input project, or the like.

With specific reference to the situation of an insured claiming damages on their house due to wind, fire, hail, flooding, etc., the existence of Managed Repair programs can become useful. Managed Repair programs can be successful with highly controlled situations. For example, when a hose on the washer bursts causing a water loss in the basement of an insured's property, no one knows except the insured. There are EPA and other standards that are accepted by the industry with respect to the activities required to remove the water damage from the property. Water losses account for approximately 35% of insurance claims and they are generally kept private.

Contrast this with a hail storm. It is on the news, everyone in the neighborhood knows and is affected, specialized weather mapping services specific to hail events can be subscribed to by contractors, and as such "stormers" and anyone with a ladder and a truck can become a roofer or subcontractor and begin soliciting business. Furthermore, though there are some areas with building codes in the roofing construction space, there are no set standards of practice of when to repair or a replace a roof that are industry wide. Each carrier has different standards and adjusters have the ability to negotiation based on situational information.

The activities associated with repairing a water loss versus a roofing loss vary in scale as the average indemnity is $2,731 versus $8,188 and in material. The ordering of roofing versus flooring materials is much more complicated requiring specialized equipment, personnel, lines of credit, etc.

Because the roofing insurance events are much more uncontrolled as compared to water damage events, it becomes vastly more difficult for an insurance company to effectuate a Managed Repair program for roof damage as compared to flood damage. The homeowner is going to call in a loss with a contractor who knocked on their door to help start the claim process 30% of the time, and the contractor is going to have pre-sold material details to the insured to help them expect results and seek the repair with that contractor. That makes it difficult for the carrier to maintain a program which would slow down the repair process in the eyes of those insureds. Additionally, the lack of standardization becomes a challenge in that the estimate practices drive profitability and with no industry standards, contractors are not able to understand if they can perform services for the program profitably. As a result, contractors look for items the carrier missed and try to include them or they attempt to upgrade services to the insured (which are not covered by the indemnity check), or cut corners during the repair process. Any of these three items will cause friction in the insurance Managed Repair program because they either make the insurance company look bad (missing things) or not paying for things (upgrades), or the contractor looks bad (cutting corners) which can lead to roofing system problems and the carrier removing the contractor from the program and losing money and expensive secondary repairs.

All of these issues also cause the insured to call the adjuster or agent who recommended the program and complain or ask questions. The agent and adjuster are busy and get nothing out of recommending a Managed Repair program. As such, if that program causes any strife in their workflows, or increases their call volume, etc., they stop recommending the program. This of course reduces the volume of leads going into the program. When leads go down, the contractors have fewer claims to amortize their expenses across (associated with the program; some have annual licenses, or built in discounts, etc.) and this causes them to do the three aforementioned items more regularly (find more damages, upgrade, or cut corners), causing a vicious circle which slowly cuts off more leads to the program due to the agents and adjusters opting out until in many situations the corporate offices of the carrier shut down the program or stop using that portion of the program (roofing).

Lastly, there is one more unique problem with roofing Managed Repair. Today there are manufacturers who maintain and promote a network of certified roofing contractors. To maintain the membership with manufacturers and have this positive status, the contractor must sell warranties and install that manufactures' materials and or systems. These systems and shingles are many times more expensive then insurance pricing. As such, by doing insurance work the contractor is less able to qualify for the certification by the manufacturer and is, therefore, in large part at direct odds with insurance Managed Repair programs. Water Managed Repair does not face these issues and are highly successful as a result.

It is, therefore, an aspect of the present disclosure to solve or greatly improve all of these problems for the roofing segment of Managed Repair along with any other complex Managed Repair programs.

In accordance with embodiments of the present disclosure, prior to a matching system being utilized on a specific address, a database of contractors with elements can be maintained that is accessible to the matching system or part of the matching system. The database can be loaded by partner (e.g. roofing manufacturer, Managed Repair contractor, contractor at large, etc.) or some other entity. The database contains among other things, by contractor, required elements such as a price per square foot for different grades of material (e.g. 30 year, 40 year, lifetime, etc.) of installed material in a basket of goods that is considered standard work (e.g. remove felt, waste, nails, caps, remove top layer of shingles, remove metals, install felt, install shingles, install new metals, disposal for said items, all work up to a slope of $10/12$, etc.) as well as pricing by specified unit of non-standard work (e.g. ice and water shield, decking, steep $10/12+$, etc.) as well as optional elements which may include their service types, certifications, experience, team size, schedule, average project size, customer feedback scores, insurance carrier feedback scores, Managed Repair programs for whom they work, etc.

When an adjuster arrives onsite to settle a loss, the adjuster may utilize the following technologies: (i) a pricing system which has standardized labor and pricing database coupled with an estimating application; (ii) an aerial CAD imagery report of the roof. When the adjuster completes their workflow as-is today, their work product includes an estimate that incorporates numbers one and two above.

In some embodiments, the matching system proposed herein then connects to the estimating platform's online component and extracts the estimate data and potentially the CAD data, photos, location attributes, and other project elements. The matching system then parses the data into a specific format that can be used in the process of translating the data to contractor attributes (or vice versa), thereby facilitating a matching between the contractor and the project that was just estimated by the adjuster. Based on the parsing and translating, embodiments of the present disclosure can then group the estimate data into program and non-program work and further group the program work into standard and non-standard work.

In some embodiments, the matching system disclosed herein is capable of analyzing the price per square for the program work standard basket of goods and the program work non-standard items pricing. In some embodiments, the matching system can further analyze the loss type, materials, and situational components to understand the project requirements by skill level for a contractor. The matching system can further analyze the carrier or other customer type, the "Customer" requirements for the managed repair program which may include contractors, loss types, estimate dollar values, response time, and other attributes.

Thereafter and in accordance with at least some embodiments, the matching system may then analyze whether or not there exists a contractor in the database that matches the Customer Managed Repair requirements as determined above. To be a qualified match, the price per square for the basket of goods and the other characteristics should match for that zip code. In some embodiments, the matching system may perform a look up for each variable and give each variable a pass or fail rating which is rolled into an aggregated rating showing the quality of the match. Based on the Customer specifications, the quality of the match may be accepted by the matching system automatically or presented to the Customer for ultimate acceptance.

In some embodiments, when the matching system finds a match between a contractor and the job being estimated, the matching system may be configured to notify the Customer, the insured, the adjuster, and/or the contractor. The notification may be in the form of one or more of: transmitting emails, initiate a call (e.g., a conference call between the Customer and the contractor), send data through a system, etc. Documentation may also be included in the notification and may be standardized to include the requirements as set by any stakeholder.

This matching system creates an efficiency for all stakeholders by automatically translating the adjuster estimate into a understood pricing model used by contractors without either the contractor or the adjuster having to understand the differences with component-based estimating versus price per square estimating or each carrier's claim settlement guidelines and further qualifying that a contractor in that market will accept the tasks associated with the repair of the property without necessitating a site visit for the contractor.

This system generates qualified, real leads, backed by inspection data that is transferred to the appropriate party without much of the duplication in data collection and associated costs. In some embodiments, this would allow the adjuster to complete their estimate and within moments provide the insured with one or many qualified contractors who will perform the services for the specified price (indemnity payment under the insurance contract between the policyholder and the insurance carrier). Even if the insured already has a contractor, they can use these as backups or compare them to replace their existing contractor if desired.

With respect to the insurance company, the company is able to effortlessly provide a more holistic solution to the insured while still giving them freedom to use whomever they see fit. Further, as an insurance company, the evidence that there are other contractors in the market who will perform the services at the specified price puts downward pressure on the contractor that is not part of the program if they request more money for the same services eliminating waste in the current system.

With reference now to FIGS. 1-7, various examples or features capable of deploying a matching system will be described in accordance with at least some embodiments of the present disclosure. The following description is not intended to limit the claims to any particular embodiment described in connection with a particular figure. To the contrary, elements from any of the figures may be combined with other elements from other figures to provide a functional and efficient matching system. For instance, the features of FIG. 1, 2 or 3 may be adapted to perform some or all of the methods described in any of FIGS. 4-7.

With reference initially to FIG. 1, an illustrative communication system 100 will be described in accordance with at least some embodiments of the present disclosure. The communication system 100 of FIG. 1 may be a distributed system and, in some embodiments, comprises a communication network 104 connecting one or more communication devices 108 to an estimating system 112 and/or a matching system 116. In some embodiments, the communication network 104 also connects one or more communication devices 108 to a rebate system 804 depicted in FIG. 8. Also in some embodiments, the estimating system 112, matching system 116, and rebate system 804 may be implemented in a common entity and may reside in a common enterprise network (e.g., behind a common firewall). In other embodiments, the systems 112, 116, 804 may be implemented by different entities and/or at different enterprise networks. In some embodiments, the estimating system 112, matching system 116, and/or rebate system 804 may be implemented on a common server and that particular server may have some or all of the components of both the estimating system 112, matching system 116, and/or rebate system 804. The depiction of the estimating system 112 as being separate from the matching system 116, and the depiction of the rebate system 804 as being separate from the estimating system 112 and the matching system 116, is for illustrative purposes only and should not be construed as limiting the communication system to any particular configuration.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The communication devices 108 may correspond to customer/insured communication devices, contractor communication devices, estimator communication devices, insurance company communication devices, or the like. In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the systems 112, 116 depicted in FIG. 1 and the system 804 depicted in FIG. 8. The type of physical medium used by the communication device 108 to establish a communication channel or multiple communication channels with systems 112, 116, 804 may depend upon the capabilities of the communication device 108, the capabilities of the systems 112, 116, 804, the type of network 104 connecting the communication device(s) 108 with the systems 112, 116, 804, etc. It should be appreciated that any media type may be used to exchange network-connected devices.

The estimating system 112 may be implemented on a server or collection of servers. The estimating system 112 is shown to include an estimator interface 128 and an estimate attribute builder 132. The estimating system 112 is further shown to have connectivity to an estimate attributes database 120.

In some embodiments, the estimator interface 128 may correspond to one or a plurality of dialogs, webpages (e.g., HTML pages), scripts (e.g., XML), or the like that are deliverable to an estimator's communication device 108. When presented with the estimator interface 128, the estimator may input various types of information about a property and the scope of work to be performed on that property. The data input by the estimator during this estimation process may be referred to as estimate attributes. In some embodiments, the estimator may be provided with a script or workflow in which the estimator responds with various answers to questions. As the estimator answers questions on his/her communication device 108, those answers are provided to the estimate attribute builder 132 to generate an estimate of the overall material and/or labor requirements to complete the particular job being estimated. As the estimate builder 132 builds these estimate attributes, the estimate attributes may be input into the estimate attributes database 120 as one or more data entries.

The estimate attributes database 120 may correspond to any type of hierarchical or non-hierarchical database in which one or a plurality of data sets may be stored. The estimating system 112 may comprise a database interface specific to the database 120 type that enables the estimating system 112 to input data into the database 120 and retrieve data from the database 120. In some embodiments, the database 120 may correspond to a SQL or non-SQL database. In other embodiments, the database 120 may correspond to a link-list database, a graph database, or any other type of database 120. As data is input into the database 120 by the estimating system 120, an index of the input data may be updated within the estimate attributes database 120 or at any interfaces to the database.

The matching system 116 is similar to the estimating system 112 in that the matching system 116 may also be connected to one or more databases. In particular, the matching system 116 is shown as having connectivity to the estimate attributes database 120 as well as a contractor attributes database 124. The matching system 116 may comprise one or multiple database interfaces, again specific to the database 120, 124 type.

The matching system 116 is also shown to include a contractor interface 136, an estimator/carrier interface 140, an attribute translation engine 144, a matching engine 148, and a messaging engine 152. The contractor interface 136 and estimator/carrier interface 140 may be similar to the estimator interface 128 in that the interfaces 136, 140 may present information to communication devices 108 and receive responses back from the communication devices 108. Again, the types of technologies that may be used for these interfaces 136, 140 include, without limitation, dialogs, webpages (e.g., HTML pages), scripts (e.g., XML), or the like that are deliverable to a communication device 108. The contractor interface 136 may correspond to a particular interface for contractors whereas the estimator/carrier interface 140 may correspond to a particular interface for estimators or contractors. A customer may also have access to the estimator/carrier interface 140 or to a different interface (e.g., a customer interface).

The attribute translation engine 144 may correspond to one or more instruction sets that enable the matching system 116 (or a microprocessor thereof) to translate attributes of one type to attributes of another type. More specifically, the attribute translation engine 144 may provide the matching system 116 with the capability to translate a basket of goods or estimate attributes input by an estimator into a price per square foot estimate (or some other estimate type used by contractors) for completing a project associated with the basket of goods. The price per square foot estimate can be compared to contractor attributes input by contractors into the contractor attributes database 124 through the contractor interface 136.

Once estimate attributes have been translated into a common attribute type or language as the contractor attributes, the matching engine 148 may then perform a comparison or matching process whereby contractors are determined to be qualified or not qualified for the job based on whether or not the contractor attributes meet particular performance or pricing requirements. If the matching engine 148 finds one or more qualified contractors for a particular project, then the messaging engine 152 may be used to provide appropriate messaging to the customer/insured, the estimator, the insurance carrier, the qualified contractor(s), and/or the unqualified contractor(s). The messaging engine 152 may generate customize messages or notifications for each interested party depending upon their role, rules, and whether or not a qualified contractor was identified. For instance, a qualified contractor may be notified of a new job for which they have qualified and an indication that they have been selected to complete said job, whereas an unqualified contractor may be notified that they did not qualify for a particular job along with a reason why they did not qualify (e.g., bid was too expensive, customer had their own contractor, work was outside their defined region, etc.).

Figure 2:
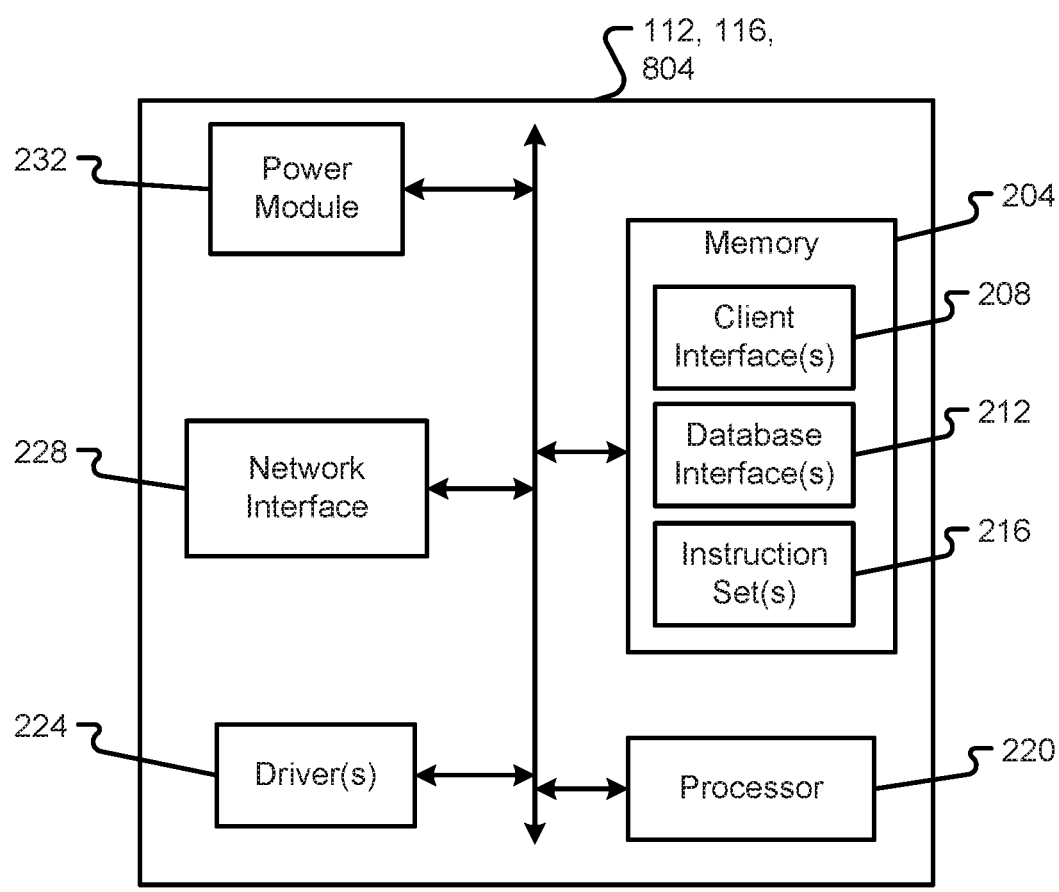
FIG. 2 is a block diagram depicting components of a server used in a communication system in accordance with at least some embodiments of the present disclosure.

With reference now to FIG. 2, additional details of the estimating system 112, matching system 116, and/or rebate system 804 as implemented by one or many servers will be described in accordance with at least some embodiments of the present disclosure. The system 112, 116, 804 is shown to include computer memory 204 that stores one or more instructions sets, applications, or modules, potentially in the form of client interface(s) 208, database interface(s) 212, and other instruction set(s) 216. The system 112, 116, 804 is also shown to include a processor 220, one or more drivers 224, a network interface 228, and a power module 232.

The memory 204 may correspond to any type of non-transitory computer-readable medium. In some embodiments, the memory 204 may comprise volatile or nonvolatile memory and a controller for the same. Non-limiting examples of memory 204 that may be utilized in the reader 108 include RAM, ROM, buffer memory, flash memory, solid-state memory, or variants thereof. Any of these memory types may be considered non-transitory computer memory devices even though the data stored thereby can be changed one or more times.

The applications/instructions 208, 212, 216 may correspond to any type of computer-readable instructions storable in memory 204. The client interface(s) 208 may correspond to a generic version of the various types of communication device interfaces depicted in FIG. 1. In particular, an estimator interface 128, a contractor interface 136, an estimator/carrier interface 140, and/or an estimating system interface 808 may each be referred to as a client interface 208 due to their ability to interface the server with a client/communication device 108.

Similarly, the database interface(s) 212 may correspond to any type of database interface that provides connectivity between the server and one or more of the estimate attributes database 120, the contractor attributes database 124, the purchasable quantities database 824, and the rebate program database 828. The database interface(s) 212 may be specific to the type of database with which the server communicates or they database interface may be generic to any type or multiple types of databases.

The instruction set(s) 216 may include one or more of the applications 132, 144, 148, and/or 152 depicted in the systems 112, 116 and/or 804. In particular, the instruction set(s) 216 may correspond to computer-readable instructions that are executable by the processor 220 and, when executed, facilitate the server or system 112, 116, 804 to provide the functionality associated with the instruction set(s) 216. As a non-limiting example, the matching engine 148 may correspond to a particular set of instructions 216 that enables the server of matching system 116 to perform a process that matches a project or estimated work item with one or more contractors after the estimate attributes have been translated into a common language or attribute type as the contractor attributes.

FIG. 2 is illustrative for purposes of showing a single server implementing all of the possible functions described in connection with FIG. 1 (and FIG. 8). It should be appreciated that a server may implement only a subset of the applications/instruction sets stored in memory 204.

The processor 220 may correspond to one or many microprocessors that are contained within a common housing or blade with the memory 204. The processor 220 may be a multipurpose, programmable device that accepts digital data as input, processes the digital data according to instructions stored in its internal memory, and provides results as output. The processor 220 may implement sequential digital logic as it has internal memory. As with most known microprocessors, the processor 220 may operate on numbers and symbols represented in the binary numeral system.

The driver(s) 224 may correspond to hardware, software, and/or controllers that provide specific instructions to hardware components of the server thereby facilitating their operation. For instance, the network interface 228 and/or memory 204 may each have a dedicated driver 224 that provides appropriate control signals to effect their operation. The driver(s) 224 may also comprise the software or logic circuits that ensure the various hardware components are controlled appropriately and in accordance with desired protocols. For instance, the driver 224 of the network interface 228 may be adapted to ensure that the network interface 228 follows the appropriate network communication protocols (e.g., TCP/IP (at one or more layers in the OSI model), UDP, RTP, GSM, LTE, Wi-Fi, etc.) such that the network interface 228 can exchange communications via the communication network 104. As can be appreciated, the driver(s) 224 may also be configured to control wired hardware components (e.g., a USB driver, an Ethernet driver, fiber optic communications, etc.).

The network interface 228 may comprise hardware that facilitates communications with other communication devices over the communication network 104. As mentioned above, the network interface 228 may include an Ethernet port, a Wi-Fi card, a Network Interface Card (NIC), a cellular interface (e.g., antenna, filters, and associated circuitry), or the like. The network interface 228 may be configured to facilitate a connection between the server and the communication network 104 and may further be configured to encode and decode communications (e.g., packets) according to a protocol utilized by the communication network 104.

The power module 232 may include a built-in power supply (e.g., battery) and/or a power converter that facilitates the conversion of externally-supplied AC power into DC power that is used to power the various components of the server. In some embodiments, the power module 232 may also include some implementation of surge protection circuitry to protect the components of the server from power surges.

Figure 3:
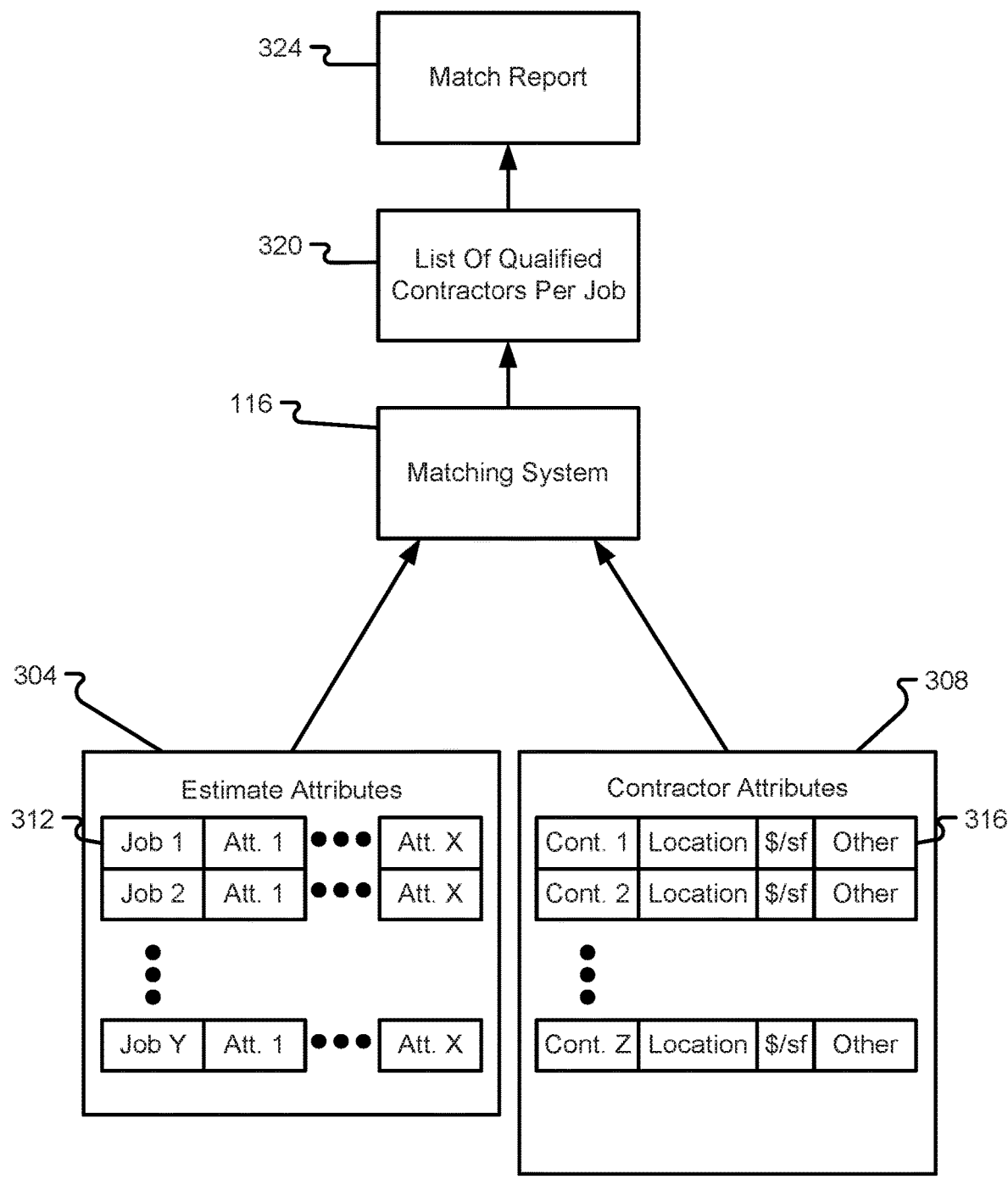
FIG. 3 is a block diagram depicting a matching system and its operation in accordance with at least some embodiments of the present disclosure.

With reference now to FIG. 3, additional functionality of the matching system 116 will be described in accordance with at least some embodiments of the present disclosure. The matching system 116 is shown to have access to estimate attributes 304 and contractor attributes 308, which may be stored in an estimate attribute database 120 and contractor attribute database 124, respectively. The estimate attributes 304 are shown to include a plurality of data sets 312, where each data set 312 corresponds to a different job which has had its scope estimated by an estimator and/or the estimating system 112. In the depicted embodiment, up to Y data sets 312 are shown, where Y is an integer that is greater than or equal to one. Each data set is shown to include a job or estimate identifier (e.g., the first field) and a plurality of associated attributes (e.g., X attributes where X is an integer greater than or equal to one). The number of fields in one data set 312 does not necessarily have to equal the number of fields in another data set.

The contractor attributes 308 are also shown to include a plurality of data sets 316, where each data set 316 corresponds to a different contractor's bid for a particular type of work or basket of goods. In some embodiments, a single contractor may have multiple bids or data sets 316 contained within the contractor attributes 308. In some embodiments, a single data set 316 may comprise each of the different bids for different baskets of goods made by a single contractor. In some embodiments, a single contractor may provide only a single bid for a single basket of goods. As shown in FIG. 3, the types of information that may be contained within the fields of a contractor's data set 316 include a contractor identifier, a location field, a price per square foot bid (or some other aggregate bid for a collection of items in a basket of goods), and other data fields. The type of information that may be contained in the other data fields include an identifier of the type of basket of goods for which the bid is made, a preference for work, a list of references, a list of previous work done in connection with the matching system 116, notification preferences (e.g., email contacts, phone numbers, etc.), and other information particular to a contractor or a contractor's bid.

In addition to having access to the attributes 304, 308, the matching system 116 may also have access to insurance carrier configuration options. Examples of the data that may be included in the carrier configuration options include, without limitation, locations where the automated matching program described herein is offered, the indemnity minimum value for which the program will be reviewed, the peril or loss type that for which they want to offer the program, the contractors which they will accept into the program, the basket of goods (e.g., repair item sets) that they want to be calculated to determine a match, the holistic nature of the services in comparison to the estimate (e.g., the percentage of line items offered by the contractor on the estimate), the difference in price per square for the basket of goods associated with the original estimate, the average number of instances of changes to an estimate or additional items per job for that specific TPA or contractor, the distance from the property that the closest contractor is, the number of days prior to starting the services that the contractor has committed to in the program, the number of hours that the contractor has committed to contacting the insured from receiving the job information, if the peril and estimate used certain technologies (e.g. aerial CAD measurements), if the estimate was written by a certain group within the carrier (e.g. field adjuster, desk adjuster, independent adjuster, etc.), the warranty that the contractor or third parties provide to the insured without any added fees, the discount for which the contractor provides to the carrier associated with the claim matching program if any, contractor credentials, licensing, manufacturer certifications, OSHA ratings, insurance, etc. The matching system 116 may also utilize its translation engine 144 to scrub the incoming estimate information and tease out a quality issue (e.g. contractors may not want to do work if the overall quality of the estimate is cutting corners, etc.).

When an estimate is created by the estimating system 112, the estimate attributes may be input into the database 120. The matching system 116 may then parse the data contained in the estimate attributes 304 to match the estimate with one or more qualified contractors. In some embodiments, the information that may be parsed from the estimate attributes 304 or from the data set 312 includes, without limitation, market or location for the project (e.g., metro-level, zip code, state, county, etc.), estimating price utilized by the estimator, month for the price estimate, claim number for the estimate, insurance carrier for the estimate, note of whether the estimator is a staff member or third party (e.g., independent adjuster) of the insurance carrier, note of estimate quality based on certain attributes, etc.

The attributes that may be analyzed to determine estimate quality include, without limitation, indication to replace roof but not plastic turtle vents (which would likely have been damaged by hail), replacement of items without paying to remove items (e.g., cutting corners by the carrier), amount of waste applied to a material type by the carrier based on the roof system (e.g., laminate shingle on a hip roof receiving 10% waste instead of 15% waste), total material quantities (e.g., linear feet, squares, other units) specifying the total number of squares for the roof system, siding, etc., material type (e.g., 3 tab laminate shingles, wood shakes, laminate lifetime dimensional shingles, etc.), dumpster size and quantity allowed for disposal for roofing and elevations and interior, total value allotted for dumpsters, tear off value of shingles and roofing materials, felt value for roofing system, installation value, hip and ridge value, gutter apron value, drip edge value, ventilation value, valley metals value, steep tear off value, steep install value, steep pitch in quantities for system, permit fees, starter shingles, ice and water shield membrane, roofing labor hours, roofing labor dollars, notes, structures (e.g., multiple, sheds, detached garage, etc.), skylight dollars, skylight flashings, satellites, chimney flashings each, chimney flashings dollars, chimney chase each, 301*b* felt quantity, 301*b* felt dollars, higher charge (e.g., installation of materials on a surface above two stories or various levels, 2+ 3+ etc.), extra layers of roof to be removed (e.g., multiple layers of shingles or shakes under the primary material layer), extra layer removal dollars, 14" flashing, re-decking squares, re-decking dollars, total roof level item dollars for standard program items, and/or total roof level item dollars by non-standard program items.

In some embodiments, the matching system 116 analyzes the total roof level item dollars for standard program item and any of the other attributes identified above and calculates a price per square for the items included in the standard basket of goods as defined by the configuration (e.g. roof felt, roof shingles, tear off, disposal, vents, flashings, valley metals, hip and ridge material (standard), etc.) and based on the number of squares that the roof system has. These baskets of goods may be driven by the primary material type. Examples of primary material types that may be used to define a particular basket of goods and their associated costs include, without limitation, 3-Tab shingle basket of goods, laminate shingle 30 year basket of goods, laminate shingle 40 year basket of goods, laminate shingle 50 year basket of goods, laminate shingle lifetime basket of goods, wood shake basket of goods, etc. In other words, multiple different basket types may be supported from an estimating standpoint and each of those baskets may be bid on a price per square foot basis by contractors.

The matching system 116 may also determine the price per applicable unit for the non-standard items (e.g. IWS, steep levels, etc.). In some embodiments, the matching system 116 now knows the price per square for that basket of goods and references contractor attributes 308 in the contractor attributes database 124 to determine whether any contractors are qualified to service the loss based on their entered minimums for that specific basket of goods as well as if they service the loss address.

For example, if there are six contractors in the system that service the loss area with the following make up: $262.17 Price per square from the carrier estimate for a 30 Year Laminate Basket of Goods. Then each contractor will be qualified or disqualified based on their input price per square within their associated 30 Year Laminate attribute:

$275 Contractor A: disqualified as price per square minimum is too low
  $302 Contractor B: disqualified as price per square minimum is too low
  $260 Contractor C: qualified
  $250 Contractor D: qualified
  $255 Contractor E: qualified
  $255 Contractor F: qualified It should be noted that is not a bidding system as the contractors input their attributes without any further information about the project. Rather, the matching system 116 is looking for qualified contractors and the matching system 116 is delivering qualified pricing for a basket of goods in a market by specific contractors. The matching system 116 uses this information to generate a list of qualified contractors for the estimated job (which would include contractors C-F identified above). These qualified contractors may correspond to those contractors that are both qualified and willing to perform the adjustor's estimate.

A match report 324 may then be constructed by the matching system 116. The match report 324 may include some or all of the qualified contractors identified in the list of contractors 320. This report may be distributed to the insured, the estimator, the carrier, and/or the contractors (e.g., qualified and/or unqualified contractors) via appropriate notification or messaging systems.

With the data in the match report 324, the insured and/or estimator have knowledge that there are contractors that are willing to perform the services at the estimate that was generated by the adjuster. This is valuable information because the carrier is trying to settle the loss at a fair market price. The carrier can use these data points that show that the "settlement" is reasonable for the incurred loss and the associated repairs. In some embodiments, the contractors may be organized or prioritized on the match report 324 based on one or more factors. For instance, qualified contractors could be prioritized on the match report 324 according to the percentage of the scope of work they can complete (e.g., where one contractor can complete multiple baskets of goods for an estimate whereas another contractor can only complete some of the baskets of goods for an estimate, there contractor capable of completing the multiple baskets may be given a higher priority in the match report 324). There may even be logic that prioritizes or organized based on whether a contractor provides a conditional bid (e.g., a contractor saying they will only do gutters if they also get roof may be given a lower priority as compared to a contractor that is willing to do either or both baskets of goods (gutter and roof) without condition). Another prioritization factor may include a warranty level. In this situation, the contractor providing a higher/longer warranty may be prioritized as compared to other contractors. Finally, the contractors can be filtered and/or matched in the match report 324 based on supplemental posts to the initial job. Said another way, a contractor that changes their attributes multiple times may be given a lower priority than other contractors that do not change attributes, or vice versa.

In some embodiments, contractors may be further enabled to update their basket of good pricing at any time and the carrier can update their basket of good items at any time. When the carrier updates their pricing for a basket of goods (basket of goods may be regional; a carrier may have different baskets for different areas or so could the contractor), the matching system 116 may generate an automated notice to the contractors to address their associated pricing for the basket of goods. Until the contractor has reviewed the change by a carrier to their basket of goods, that contractor's price per square could be noted as "un-verified" in the match report 324.

Figure 4:
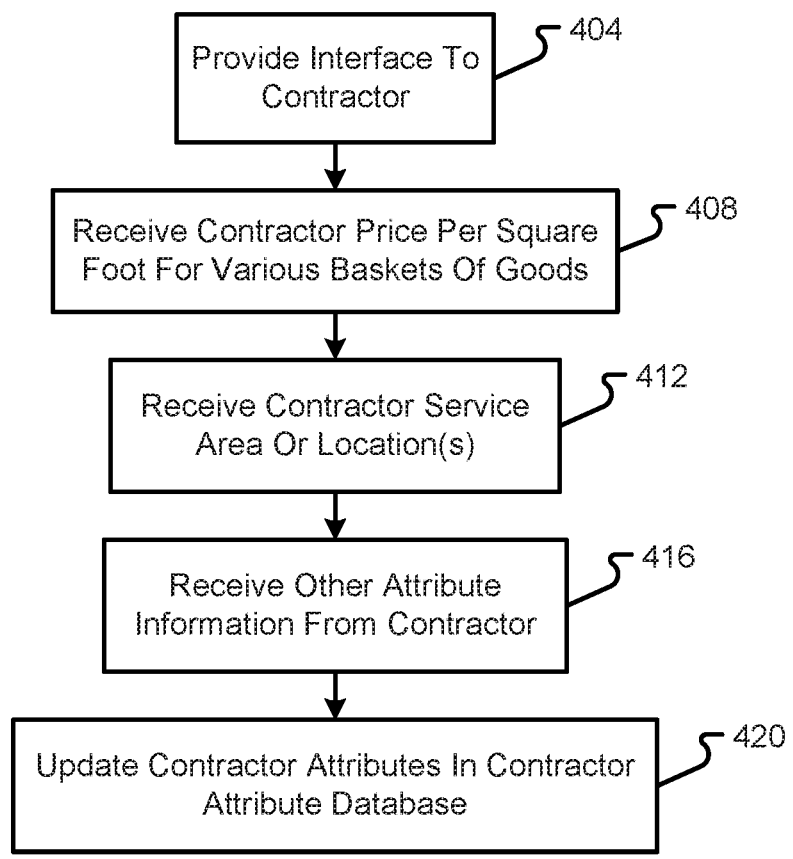
FIG. 4 is a flow diagram depicting a method of updating contractor attributes in a contractor attribute database in accordance with at least some embodiments of the present disclosure.

With reference now to FIG. 4, additional details of a method for updating contractor attributes in a contractor attribute database will be described in accordance with at least some embodiments of the present disclosure. The method begins by providing a contractor interface 136 to a contractor via their communication device 108. This interface 136 may be provided via a webpage, an application interface, a Virtual Private Network (VPN) connection, or the like.

Via this interface 136, the matching system 116 receives the contractor's pricing for various baskets of goods on a per-square basis (step 408). This information can be input into the contractor attributes 308 or a data set 316 particular to that contractor and further particular to that basket of goods (e.g., laminate shingle 30 year basket of goods).

The matching system 116 may further receive contractor service areas or locations (step 412). This information may identify locations or areas in which the contractor is willing/able to provide service within a specified time frame (e.g., within a day or two days), areas in which the contractor is situated and regularly provides service, areas in which the contractor is unable to provide service, etc.

The method may continue by receiving other attribute information from the contractor or from a carrier with respect to a contractor (step 416). The types of information that may be received in addition to the location information and pricing information include basic warranty information, years in service information, PUC license numbers, quality history, and any other information that indicates whether the contractor is qualified or unqualified to perform any type of work. It should be appreciated that one estimate may contain multiple baskets of goods without departing from the scope of the present disclosure. Furthermore, the baskets of goods do not necessarily need to be priced on a per-square basis; rather, embodiments of the present disclosure contemplate other forms of pricing such as per-linear measurement or other measurements.

Based on the information received via the contractor interface 136, the matching system 116 may update the contractor attributes 308 in the contractor attribute database 124. In some embodiments, a database interface 212 may be used to perform this particular update.

Figure 5:
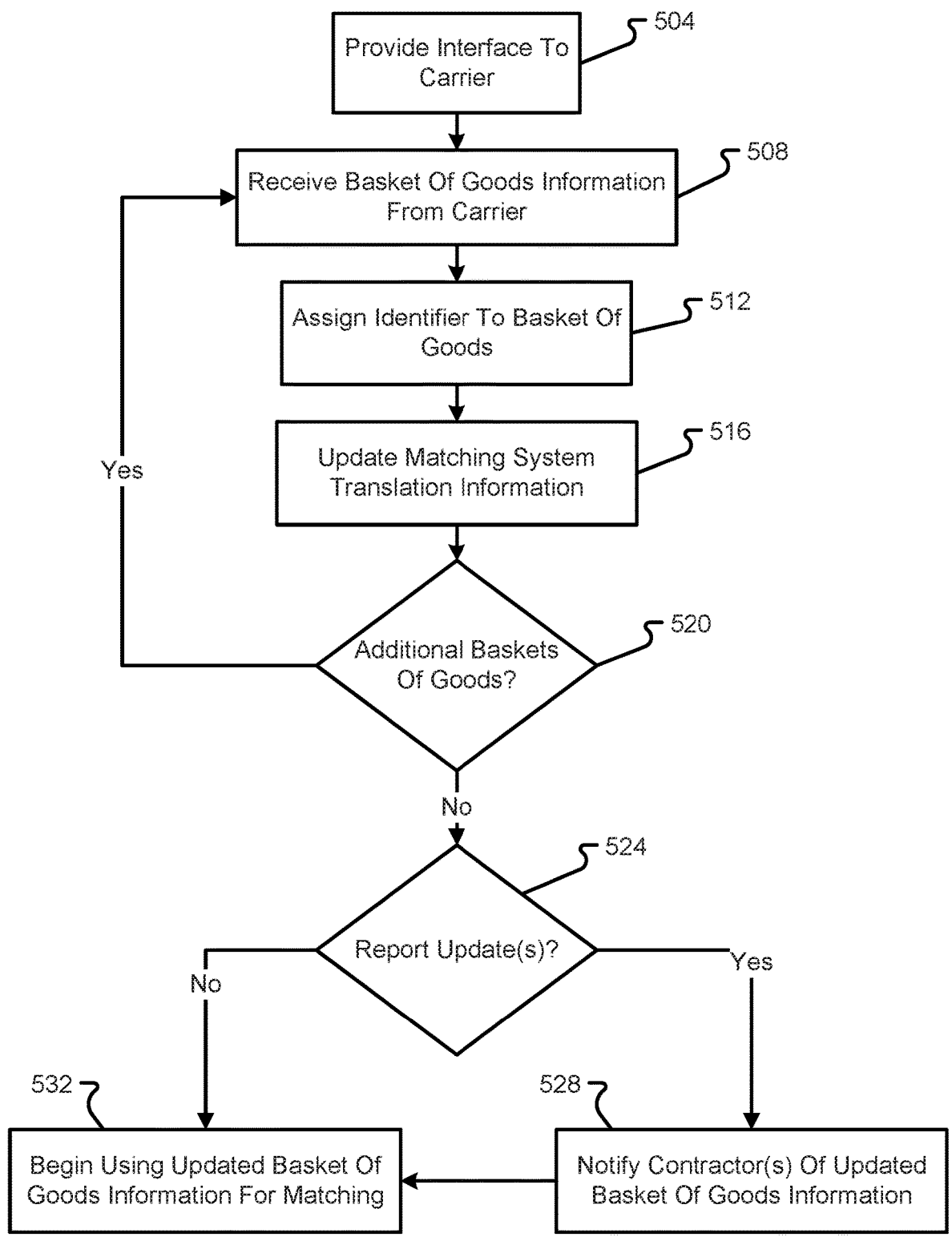
FIG. 5 is a flow diagram depicting a method of updating a matching system in accordance with at least some embodiments of the present disclosure.

With reference now to FIG. 5, details of a method for updating a matching system 116 will be described in accordance with at least some embodiments of the present disclosure. The method begins by providing an interface 140 to the insurance carrier (step 504). Via this interface 140, the carrier is able to provide basket of goods information and associated restrictions, included standard or non-standard items, permissible pricings, etc. to the matching system 116 (step 508). When this basket of goods information is received, the carrier may also provide an identifier for the basket of goods or the matching system 116 may assign one thereto. Examples of basket of goods identifiers that may be used for roofing baskets of goods include, without limitation, 3-Tab shingle basket of goods, laminate shingle 30 year basket of goods, laminate shingle 40 year basket of goods, laminate shingle 50 year basket of goods, laminate shingle lifetime basket of goods, wood shake basket of goods, etc.

The matching system 116 then updates the information used by the matching engine 148 to translate estimate attributes 304 to contractor attributes 308 or vice versa (step 516). The process then continues by determining whether there are any additional baskets of goods to be input or updated by the carrier (step 520). If this query is answered positively, then the method returns to step 508. If the query is answered negatively, then the method proceeds to step 524 where it is determined whether or not to report the basket of goods updates.

If the query of step 524 is answered positively, then one or more contractors may be notified of the updated basket of goods information and be provided with a link to update their own pricing for the updated basket(s) of goods (step 528). If the contractor does not update their associated pricing for that now-updated basket of goods, then any match between an estimate and that contractor's pricing for the now-updated basket of goods may be identified as un-verified until such time as the contractor either updates their pricing or the contractor identifies a willingness to honor their previous pricing (e.g., by accepting a project under their old pricing).

Thereafter, or if the query of step 524 is answered negatively, the method proceeds to allow the matching system 116 to use the updated basket of goods information for translation and/or matching purposes (step 532). In particular, the translation engine 144 may use the updated basket of goods information to translate estimate attributes 304 into contractor attributes 308 or vice versa. The matching engine 148 may use the updated pricing from the contractors as part of determining whether a contractor is qualified to handle a particular project or work item.

Figure 6:
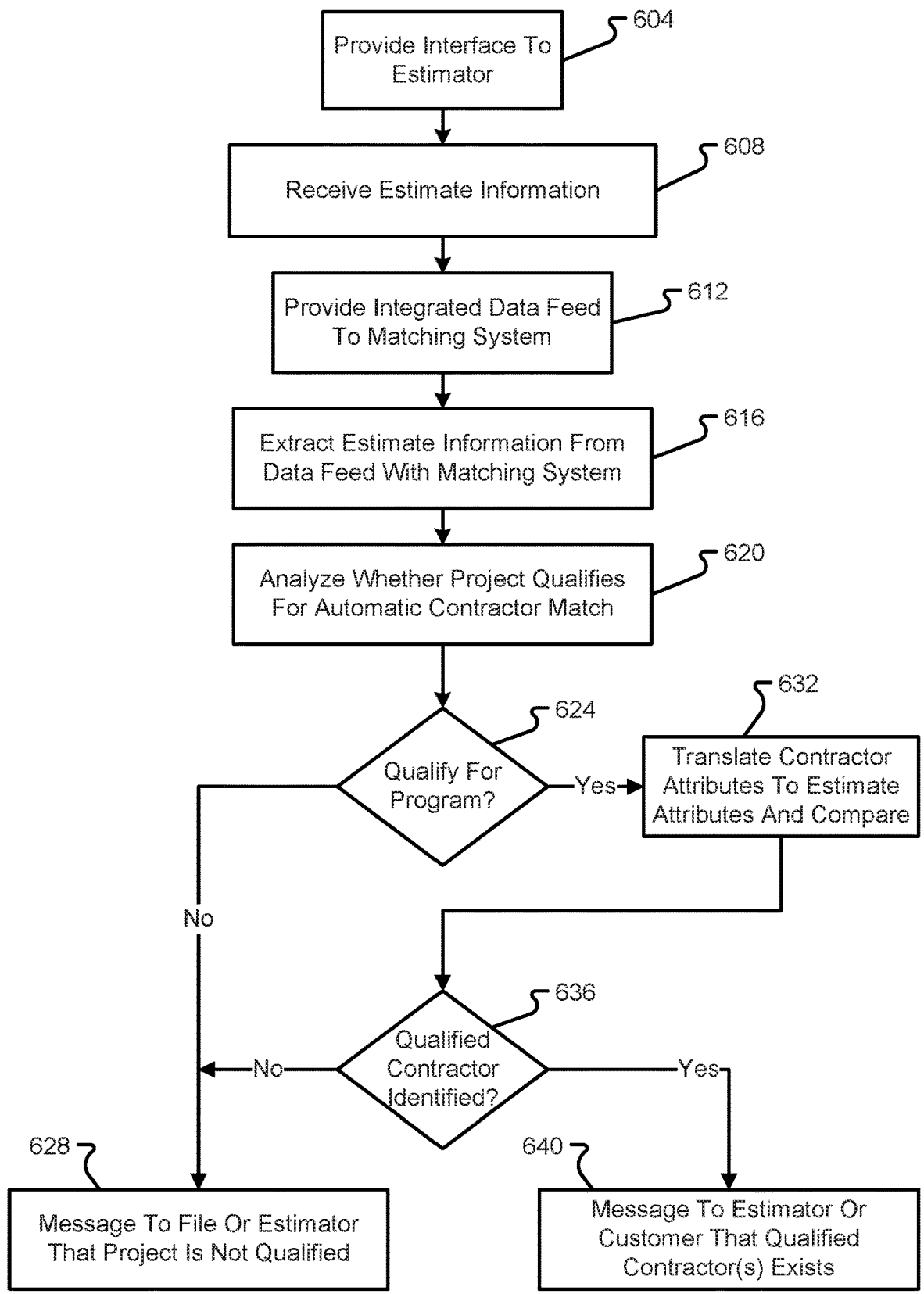
FIG. 6 is a flow diagram depicting a method of operating a matching system in accordance with at least some embodiments of the present disclosure.

With reference now to FIG. 6, details of a method for operating a matching system 116 will be described in accordance with at least some embodiments of the present disclosure. The method begins by providing an interface 128, 140 to an estimator's communication device 108 (step 604). Via the interface 128, 140, the estimator will be able to provide estimate information or attributes to either the estimating system 112 or matching system 116 so that estimate attributes 304 can be updated in connection with the work item or project being estimated or adjusted by the estimator (step 608). This information can be included into the estimate attributes 304 as one or more data sets 312 with an appropriate job identifier and associated attributes.

The information from the estimate can be provided as an integrated data feed directly to the matching system 116 or through the estimate attributes database 120 (step 612). The matching system 116 may utilize the attribute translation engine 144 to extract the estimate information from the integrated data feed or database 120 (step 616). The extracted estimate information may then be translated to a common language or attribute structure (e.g., price per square) as the contractor attributes 308.

This translation enables the matching engine 148 to analyze the project and determine whether the project itself qualifies for an automatic contractor match (step 620). Projects that may not be eligible for this automated matching process include, without limitations, projects with an estimate exceeding a predetermined total value, projects with a ratio of non-standard items to standard items exceeding a predetermined amount, projects in particular areas or regions, projects outside of particular areas or regions, projects that have been estimated by a non-member estimator, etc.

If the project itself does not qualify for the automated matching program (as determined in step 624), then the estimator, carrier, and/or customer are provided with one or more messages indicating that the project did not qualify for the matching program (step 628).

If, however, the project is identified as qualifying for the automated matching program, then the method continues by allowing the translation engine 144 to translate the contractor attributes 308 and/or the estimate attributes 304 into a common format or language such that the attributes can be compared to one another (step 632). Based on this comparison, the matching engine 148 determines whether any qualified contractor(s) are identifiable within the contractor database 124 (step 636). If so, then one or more messages are provided to the estimator, customer, carrier, and/or contractor to indicate the existence of a qualified contractor for the project (step 640). On the other hand, if there are no qualified contractors, then the method proceeds to step 628 to provide adequate messaging to one or more of the customer, carrier, estimator, and/or contractors that service the area in which the project is located.

Figure 7:
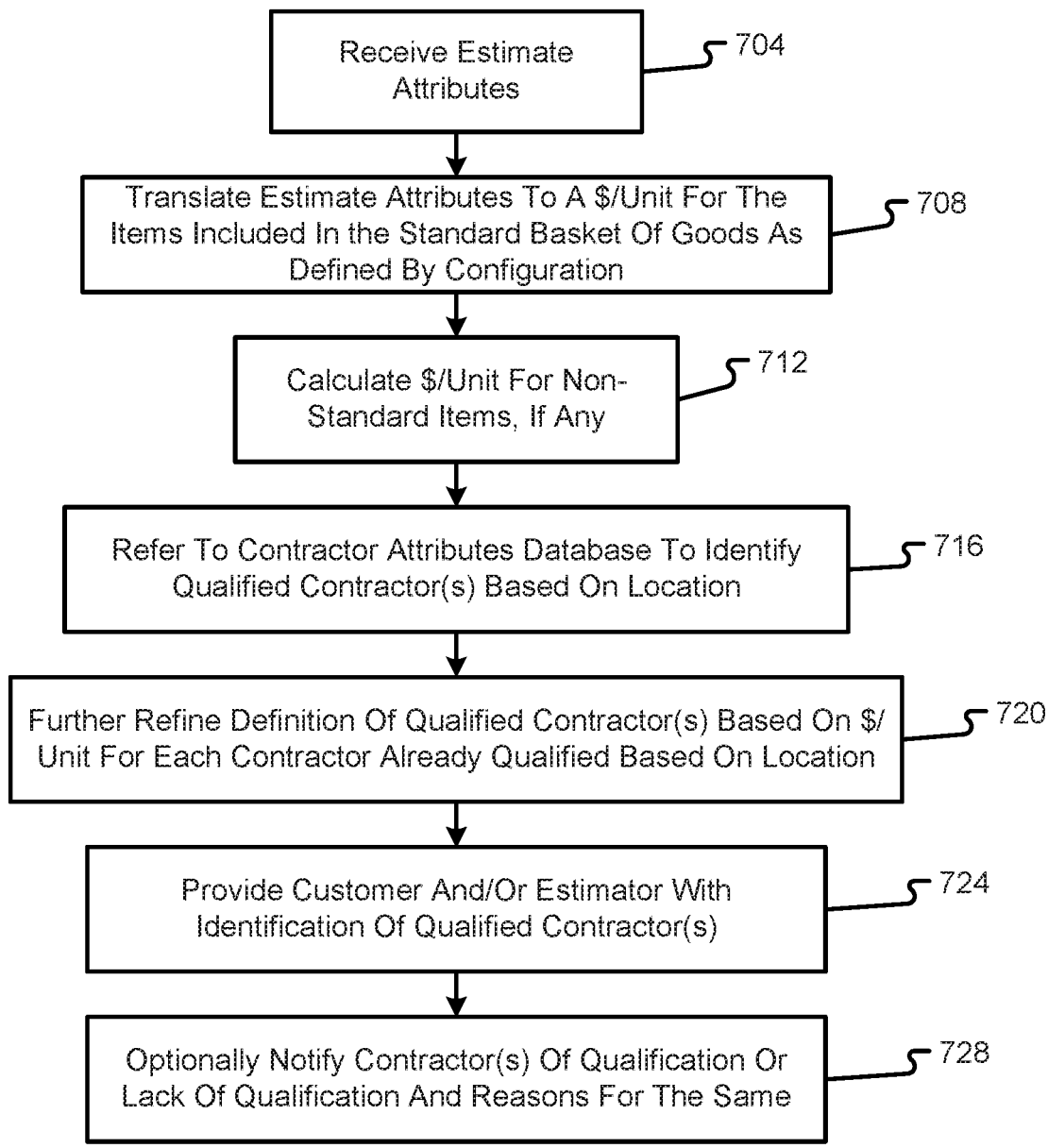
FIG. 7 is a flow diagram depicting a method of identifying qualified contractors for a project or job in accordance with at least some embodiments of the present disclosure.

With reference now to FIG. 7, a method of identifying qualified contractors for a project or job will be described in accordance with at least some embodiments of the present disclosure. The method begins when estimate attributes 304 are received for a particular job (step 704). The estimate attributes 304 may be received at the matching system 116 which translates the estimate attributes to a price per square unit for the job (e.g., the identified basket of goods) (step 708). The matching system 116 may further calculate the price per unit for any non-standard items identified in the estimate (step 712).

The matching system 116 then refers to the contractor attributes 308 in the contractor attribute database 124 to identify one or more qualified contractor(s) based on location (step 716). The matching system 116 may further refine its definition of a qualified contractor based on the price per unit given by each contractor that has been qualified based on their location (step 720). This particular order of operations is helpful because it may be possible to eliminate many contractors from further considerations (and comparison processing) based simply on service area. This helps to increase the processing efficiency and speed of the matching system 116.

Based on the processing performed by the matching system 116, a list of qualified contractors 320 may be identified by the job. The matching system 116 may provide the customer, estimator, and/or carrier with the list of the qualified contractors 320 via a match report 324 or the like (step 724). Optionally, the contractor(s), whether qualified or non-qualified, may be notified of their inclusion to or exclusion from the list of qualified contractors for the job (step 728). This notification may be provided by including the match report 324 as an attachment to an email, by sending information about the job via SMS or MMS message, or via some other communication modality.

Turning to another aspect of the present disclosure, an opportunity exists for insurers to coordinate with third party suppliers, vendors, manufacturers, contractors, and managed repair programs, amongst other vendors, or to form direct repair programs to gain a financial benefit for the hundreds of millions of dollars spent by insurance carriers on severity, while still making the insured whole for damages. This opportunity is not currently being realized for several reasons. One such reason is that the bundling of assemblies and components into a single line item during the estimating process, though a benefit for estimate writing, creates challenges for managing materials and incentive programs. For example, a single line item in an estimating system for the installation of roofing shingles may encompass labor, shingle material, felt paper material, staples, overhead, delivery, tax, and profit, among other things. As a result, there is no specific estimate for the materials or other items that may be covered by an incentive program.

Insurance carriers are further challenged in their efforts to capture value from incentive programs, direct repair programs, and other forms of coordination with suppliers, vendors, and other third parties because the systems commercially available today are not efficient for human interaction and provide little time for inspecting and settling a claim with the insured after emergency repairs and severe damage. The insurer provides payments quickly, to protect and repair the property and to provide great service to the insured in relation to the claim. Estimating systems may contain hundreds or even thousands of line items with embedded material sub-components (e.g. in which materials included in the line item are not specifically identified and are not associated with a stand-alone cost). Each material sub-component may have complicated criteria in order to qualify for a rebate or incentive, including, for example and without limitation, a minimum order size, specific payment terms that trigger a rebate, regions in which rebates do and do not apply, and physical locations in which the materials must be picked up in order for the material to count toward a rebate. To accurately follow these requirements and calculations—particularly when the material sub-components are included in a bundled estimate line item that provides no specific information regarding the material sub-components themselves—often simply is not plausible.

In addition, initial severity payments are based on estimates, and tracking total payments over the life of a claim—which may include multiple supplements completed by multiple users (e.g., staff field adjusters, staff desk adjusters, agents, independent adjusters, managed repair programs, direct repair programs, third party administrators, or contractors)—creates further challenges in processing, calculating, and successfully submitting rebates or other like incentives. For example, the first and second user may not understand what has already been completed in the form of these incentives. There may also be reductions in payments at times, adding additional complications amongst multiple users.

Further, estimates are rarely defined as purchasable quantities. Instead, they remain component and quantity specific for the claim settlement objective. Actual purchasable quantities typically differ from amounts identified in estimates. As just one example, an estimating system may require 23.4 pounds of nails, but nails may be sold by suppliers in a 50-pound box. This further complicates the rebate process for an insured, as contractors, rather than adjustors, typically have the expertise needed to translate estimates into work order purchasable quantities. This raises a training issue for insurers, which is cost-prohibitive given the difficulty of obtaining rebates in the current environment. Also, even though a purchasable quantity of nails may not exist for a single claim, a purchasable quantity of nails may exist across multiple claims depending the particular incentive and rebate structure at issue. It is unreasonable, however, for users to know the details at an aggregate level, and to know when to apply a purchasable quantity due to privacy, claim management and other concerns.

These are just a few reasons that carriers and the like are not presently reasonably able to realistically benefit from rebates and incentives. Systems and methods of the present disclosure, however, introduce automation into the rebate and incentive process in such a way as to allow insurance carriers to benefit from the untapped potential of rebate and incentive programs.

According to one embodiment of the present disclosure, a rebate system comprises an estimating system interface for receiving, from an estimating system, an estimate corresponding to an insurance claim, the estimate comprising one or more line items encompassing one or more needed materials; a line item extraction engine that extracts information about the one or more needed materials from the one or more line items of the estimate, the extracted information comprising at least a material identifier and a material quantity; a rebate matching engine that identifies, based on at least the material identifier, applicable rebate programs from among a plurality of rebate programs having attributes stored in a rebate program database; and an estimator/carrier/third party interface that enables communications with a communication device regarding the applicable rebate programs. The rebate system may further comprise a purchasable quantities engine that compares the material quantity to one or more purchasable quantities stored in a purchasable quantities database and determines whether at least one of the one or more purchasable quantities corresponds to the material quantity.

The rebate matching engine may further identify applicable rebate programs based on the material quantity. The attributes stored in the rebate program database may comprise at least one of a minimum order size, availability information, substitution information, a rebate rate, required payment terms, rebate accrual information, rebate calculation information, rebate frequency information, promotional package information, rebate region information, material pick-up location information, return information, rebate limitations information, tipping points for aggregate rebate amounts (buckets, which trigger higher rebates on prior purchases within a time period), and purchasable quantity information. The rebate matching engine may generate a report that lists the identified applicable rebate programs. The rebate matching engine may transmit information about at least one of the applicable rebate programs to the estimating system via the estimating system interface. At least one of the one or more line items in the estimate may comprise a bundled line item.

Additionally, the rebate matching engine may compare cost savings information about a plurality of applicable rebate programs and select an applicable rebate program associated with a greater cost savings than any other applicable rebate program in the plurality of applicable rebate programs. The rebate matching engine may automatically fill out application forms associated with at least one of the applicable rebate programs.

In some instances, a given manufacturer, supplier, or other rebate program sponsor may provide a tiered rebate program whereby the amount of the rebate increases as the volume of product purchased by the rebate program applicant increases. Often, such rebate programs have defined tiers or buckets, such that the rebate amount or percentage remains fixed at a given tier until the rebate program applicant reaches the next tier. For example, a rebate program may offer a 0.5% rebate if product worth at least $50,000 is purchased, a 1% rebate if product worth at least $100,000 is purchased, a 1.5% rebate if product worth at least $150,000 is purchased, and so on. Additionally, each tier may be defined with respect to time, such that a customer can reach a given tier by purchasing the minimum amount of product for the tier in question within the applicable unit of time (e.g. week, month, or year). Thus, in some embodiments, the rebate matching engine may further analyze each available rebate program in light of any defined tiers in the available rebate program to determine whether any additional value may be obtained from a given rebate program by reaching a new tier or bucket. For example, if several rebate programs are available, each offering a 1% rebate, but one of those rebate programs, if utilized, will cause the applicant to reach a new tier within the rebate program that will trigger a 1.5% rebate, then the rebate matching engine may assign a greater value to the latter rebate program for purposes of rebate program rankings, recommendations, and/or selection. In some embodiments, the rebate matching engine may evaluate both the value of each available rebate program with respect to a specific job and the value of each available rebate program on a macro level (e.g. across multiple jobs) for purposes of rebate program ranking, recommendations, and/or selection.

According to another embodiment of the present disclosure, a method for identifying applicable rebate programs comprises receiving, at a processor and via an interface, an estimate comprising at least one line item with an associated cost; extracting, with the processor, data from the at least one line item, the data comprising at least one material and an associated material quantity; identifying, with the processor and based on the at least one material and the associated material quantity, at least one applicable rebate program from among a plurality of available rebate programs; generating a report comprising information about the at least one applicable rebate program; and displaying the report on a user interface in communication with the processor. The method may further comprise updating, with the processor, the associated cost of the at least one line item to reflect a cost savings associated with the at least one applicable rebate program. The at least one applicable rebate program may comprise a plurality of applicable rebate programs, and the method may further comprise receiving, at the processor and via the interface, an input comprising a selection of one of the plurality of applicable rebate programs. The method may also further comprise receiving, at the processor, a command to finalize the at least one applicable rebate program.

Still further, the method may additionally comprise generating, with the processor and in response to the command, an application for a rebate under the at least one applicable rebate program. The generating may comprise automatically populating at least one application form with available information. The method may also comprise storing information about at least one of the plurality of available rebate programs in a rebate program database stored in a memory, the information corresponding to at least one of an effective date of the rebate program, an expiration date of the rebate program, one or more requirements for obtaining a rebate under the rebate program, a material covered by the rebate program, return information corresponding to the rebate program, a rebate rate corresponding to the rebate program; and a minimum order size for the rebate program.

A server in accordance with another embodiment of the present disclosure comprises a microprocessor; a communication interface; and a memory including instructions stored thereon that are executable by the microprocessor, the instructions, when executed, causing the processor to receive, via the communication interface, an estimate comprising at least one line item with an associated cost; extract data from the at least one line item, the data comprising at least one material and an associated material quantity; identify, based on the at least one material and the associated material quantity, at least one applicable rebate program from among a plurality of available rebate programs; populate an application form for the at least one applicable rebate program; and transmit the application form via the communication interface. The memory may store additional instructions that, when executed by the processor, further cause the processor to transmit a request for needed information via the communication interface; receive the requested needed information via the communication interface; and include the needed information in the application form. The memory may further store a database of available rebate programs, the database comprising at least one attribute for each of the available rebate programs. The data may further comprise at least one of location data, material grade, material definition, and material recyclability information.

Figure 8:
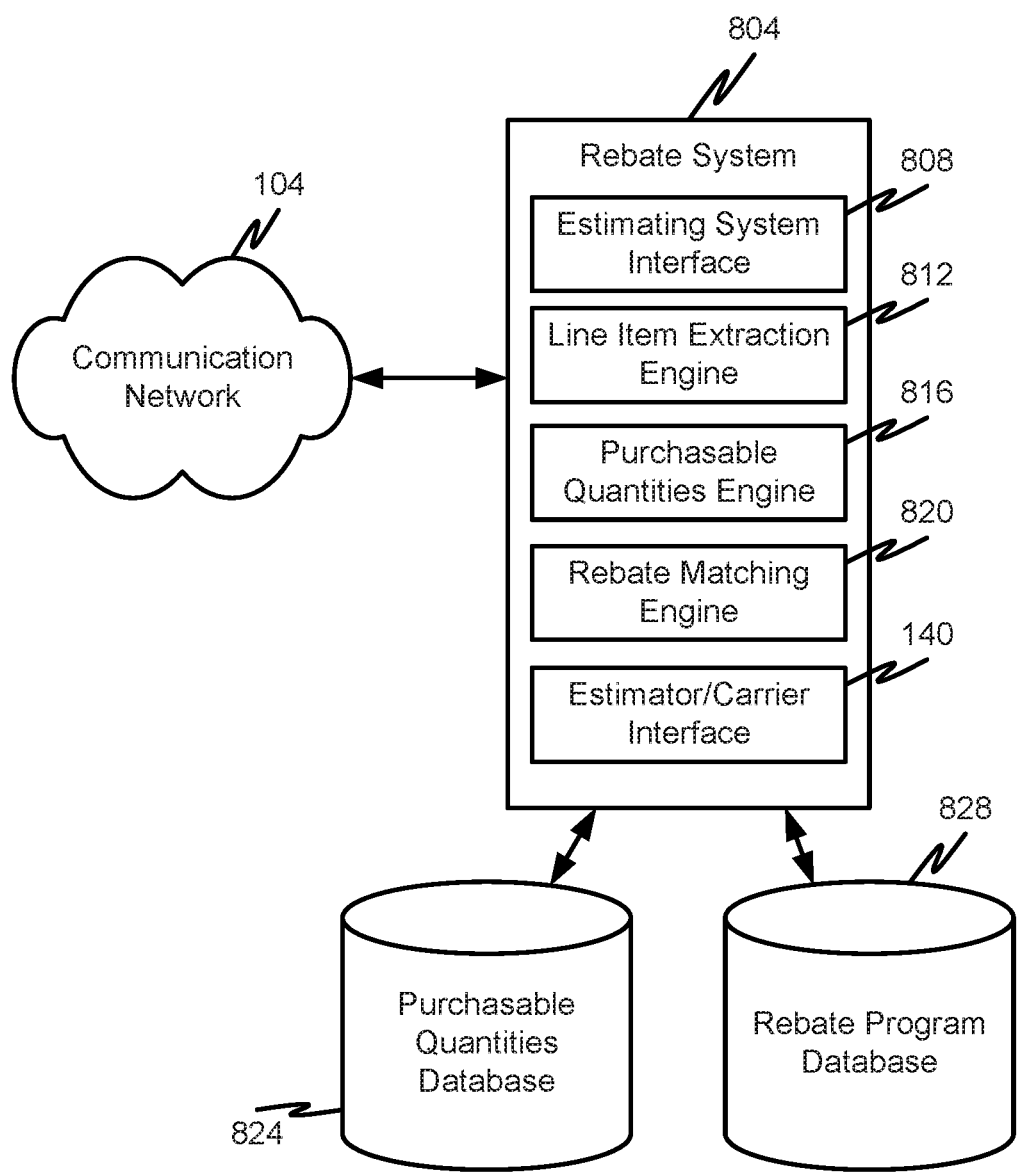
FIG. 8 is a block diagram of aspects of a communication system according to at least some embodiments of the present disclosure.

Turning now to FIG. 8, a rebate system 804 may be in communication with a communication network 104 in a system such as the system 100 illustrated in FIG. 1. The rebate system 804 may be implemented on a server or collection of servers. The rebate system 804 is shown to include an estimating system interface 808, a line item extraction engine 812, a purchasable quantities engine 816, a rebate matching engine 820, and an estimator/carrier interface 140. The rebate system 804 is shown having connectivity with a purchasable quantities database 824 and a rebate program database 828. In some embodiments, the rebate system 804 may also have connectivity with the estimate attributes database 120. The databases 824, 828 may be provided in the form of SQL or non-SQL databases and a database interface may be provided between the rebate system 804 and the databases 824, 828. The database interface may help to format database queries received from the rebate system 804 into a format consistent with operations of the database 824, 828.

The estimating system interface 808 of the rebate system 804 may use any suitable technologies, including dialogs, scripts (e.g. XML), or the like to obtain or receive estimates from the estimating system 112 and/or from the estimate attributes database 120. In some embodiments, the estimating system interface 808 may also receive estimates via the communication network 104 from outside of the system 100. Particularly in embodiments where estimates are received from sources other than the estimating system 112 and/or the estimate attributes database 120, the estimating system interface 808 may be configured to receive estimates in a plurality of formats, and may also be configured to convert estimates received in one or more formats into a different format. For example, if an estimate needs to be in a first format in order for the line item extraction engine 812 to extract line items from the estimate, then the estimating system interface 808 may convert estimates received in any format other than the first format into the first format so that the line item extraction engine can properly analyze the received estimate. In some embodiments, this importation functionality may be provided in the line item extraction engine 812 rather than in the estimating system interface 808.

The line item extraction engine 812 analyzes estimates received via the estimating system interface and extracts line items therefrom. In particular, the line item extraction engine 812 identifies line items for needed materials as well as line items that may be bundled or grouped (e.g. line items that may encompass materials as well as other items, such as labor, delivery charges, disposal fees, overhead, taxes, and profit). From these line items, the line item extraction engine 812 extracts material quantity information. For example, the line item extraction engine may identify a line item for shingle material that either provides a quantity (e.g. 2500 square feet) or provides dimensions needed to determine a quantity (e.g. shingle material for a 50 ft×50 ft roof). Alternatively, the line item extraction engine may identify a bundled line item (e.g. a line item that provides a single cost for a plurality of items that may or may not be specifically identified in the line item, including, by way of example but not limitation, labor, materials, delivery, overhead, taxes, and profit) for, as just one non-limiting example, "installation of roofing shingles." Based on an analysis of the remainder of the estimate (or based on the cost associated with this line item, which may be significantly larger than, for example, the labor cost of associated with installing roofing shingles), the line item extraction engine 812 may determine that the line item for "installation of roofing shingles" encompasses not just, e.g., labor for installation of roofing shingles, but a bundled set of cost items (e.g. materials, labor, delivery, overhead, tax, and profit). The line item extraction engine 812 may then determine—whether based on information in the line item, other information in the estimate (e.g. descriptive information about the damaged property, including dimensions of damaged roofing areas), and/or stored information about the types of materials and associated quantities associated with common tasks such as installation of roofing shingles—which materials are included in the line item and a quantity for each.

Once the line item extraction engine 812 has identified materials included in a given estimate as well as a needed quantity of each material, the purchasable quantities engine 816 compares that information with stored information about purchasable quantities of each material in the estimate (obtained from the purchasable quantities database 824) to determine the appropriate purchasable quantity or quantities to associate with the estimate. In situations where the amount of a given material required by an estimate does not satisfy any purchasable quantity, the purchasable quantity engine 812 may simply ignore that material for purposes of identifying applicable rebates. Alternatively, the purchasable quantity engine 812 may attempt to locate other pending estimates that require the same material, so as to combine the material requirement from multiple estimates into a single purchasable quantity.

The purchasable quantities database 824 may correspond to any type of hierarchical or non-hierarchical database in which one or a plurality of data sets may be stored. The rebate system 804 and/or one or more communication devices 108 may comprise a database interface specific to the database 824 (or databases of the same type as the database 824) that enables the rebate system 804 and/or the one or more communication devices 108 to input data into the database 824 and/or retrieve data from the database 824. In some embodiments, the database 824 may correspond to a SQL or non-SQL database. In other embodiments, the database 824 may correspond to a link-list database, a graph database, or any other type of database 824. As data is input into the database 824, an index of the input data may be updated within the purchasable quantities database 824 or at any interfaces to the database.

For each of a plurality of materials, the purchasable quantities database 824 may store one or a plurality of purchasable quantities, each associated with a given source, a given price, and/or a given rebate program. Thus, the purchasable quantities database 824 may store, for asphalt shingles, a purchasable quantity of 33 square feet from a first source (and possibly at a first price), and a purchasable quantity of 1,000 square feet from a second source (or possibly from the first source at a second price). Additionally or alternatively, the purchasable quantities database 824 may store an asphalt shingles purchasable quantity associated with a first rebate program of 5,000 square feet, and another associated with a second rebate program of 10,000 square feet. In some embodiments, the purchasable quantity amount may represent purchasable units (e.g. asphalt shingles must be bought in units of 33 square feet, 1,000 square feet, 5,000 square feet or 10,000 square feet), while in other embodiments the purchasable quantity amount may represent a minimum purchasable quantity (e.g. asphalt shingles may be purchased in any quantity that exceeds 33 square feet, 1,000 square feet, 5,000 square feet, or 10,000 square feet).

Taking as an example an estimate that requires 2500 square feet of asphalt shingles, where the purchasable quantities stored in the purchasable quantities database 824 represent purchasable units, the purchasable quantities engine 812 may determine that the estimate encompasses seventy-five purchasable quantities of 33 square feet, or two purchasable quantities of 1000 square feet combined with fifteen purchasable quantities of 33 square feet. In some embodiments, the purchasable quantities engine 812 may be configured to identify requirements for the same material from different estimates, and to combine material requirements from different estimates so as to achieve purchasable quantities that yield better rebates or more cost savings. In such embodiments, the purchasable quantities engine 812 may only combine material requirements from different estimates that will be serviced by the same contractor, or from different estimates that are in the same geographical area, to ensure that materials purchased in a single quantity for multiple estimates (e.g. for multiple properties) can be readily distributed. For example, if two estimates for roof replacement of homes in the same neighborhood were pending at the same time, each requiring 2500 square feet of asphalt shingles, then the purchasable quantities engine 812 may determine that combining the two requirements into a single quantity of 5000 square feet of asphalt shingles would satisfy the 5000 square-foot purchasable quantity associated with the first rebate program.

The rebate matching engine 820 uses purchasable quantity information from the purchasable quantities engine 816—or information extracted by the line item extraction engine 812—to locate applicable rebate programs from the rebate program database 828. If the purchasable quantities of one or more materials qualify for a rebate in the rebate program database 828, then the rebate program is applicable. The rebate matching engine 820 may be configured to compare a plurality of applicable rebate programs, and to select the rebate program that will yield the largest rebate. The rebate matching engine 820 may also be configured to compare applicable rebate programs with applicable bulk discount programs (e.g. programs for which the determined purchasable quantities are sufficiently large to qualify for a discount on the purchase price of a needed material), and to select the rebate program or bulk discount program that results in the greatest cost savings. In some embodiments, the rebate matching engine 820 may further be configured to compare the overall cost savings available through one or more rebate programs that cover multiple needed materials with the material-specific cost savings available through one or more rebate programs. For example, if a first rebate program provides a discount that is based not just on the quantity of material purchased but also on the number of types of materials purchased (e.g. provides a greater discount for purchasing different types of materials from the same source), then the rebate matching engine 820 may be configured to compare the cost savings available through that rebate program with the cost savings available through one or more rebate programs that apply only to one material, in order to identify the rebate program or the series of rebate programs that will result in the greatest cost savings.

The rebate matching engine 820 may be further configured to report applicable rebate programs via the estimator/carrier interface 140, via another user interface, or via the communication network 104, and to receive an indication of one or more rebate programs or bulk discount programs to utilize for a given estimate. In some embodiments, the rebate matching engine 820 may then automatically fill out any necessary application forms and cause them to be printed (e.g. for mailing to a mailing address) and/or electronically transmitted (e.g. via email or fax).

Still further, the rebate matching engine 820 may be configured to provide selected rebate information to the estimating system 112 (or to the source of the estimate in question, if the source is not the estimating system 808) via the estimating system interface 808. The estimating system 112 may then incorporate the rebate information into the estimate in question, so that the estimate reflects the lower cost(s) of materials resulting from the rebate.

The rebate program database 828, like the purchasable quantities database 824, may correspond to any type of hierarchical or non-hierarchical database in which one or a plurality of data sets may be stored. The rebate system 804 and/or one or more communication devices 108 may comprise a database interface specific to the database 828 (or databases of the same type as the database 828) that enables the rebate system 804 and/or the one or more communication devices 108 to input data into the database 828 and/or retrieve data from the database 828. In some embodiments, the database 828 may correspond to a SQL or non-SQL database. In other embodiments, the database 828 may correspond to a link-list database, a graph database, or any other type of database 828. As data is input into the database 828, an index of the input data may be updated within the purchasable quantities database 828 or at any interfaces to the database.

The rebate program database 828 stores attributes about rebate programs that are available to users of the rebate system. The rebate program attributes may be updated as necessary to ensure that the rebate program attributes are current. Thus, as new rebate programs become available, and as existing rebate programs expire or otherwise become unavailable, the rebate program database 828 may be updated to reflect these changes. As suggested above, the rebate program database 828 may store attributes about rebate programs that cover a plurality of materials, attributes about rebate programs that cover just one material, and attributes about bulk discount programs. Rebate program attributes stored in the rebate program database may include, for example, attributes regarding the dates during which the rebate or bulk discount program is in effect; attributes regarding materials covered by the program; attributes regarding requirements that must be satisfied to qualify for the program; and attributes regarding how to submit a rebate or bulk discount request (including, for example, any necessary application forms and any needed contact information, whether an email address, a mailing address, a phone number, and/or a fax number).

Figure 9:
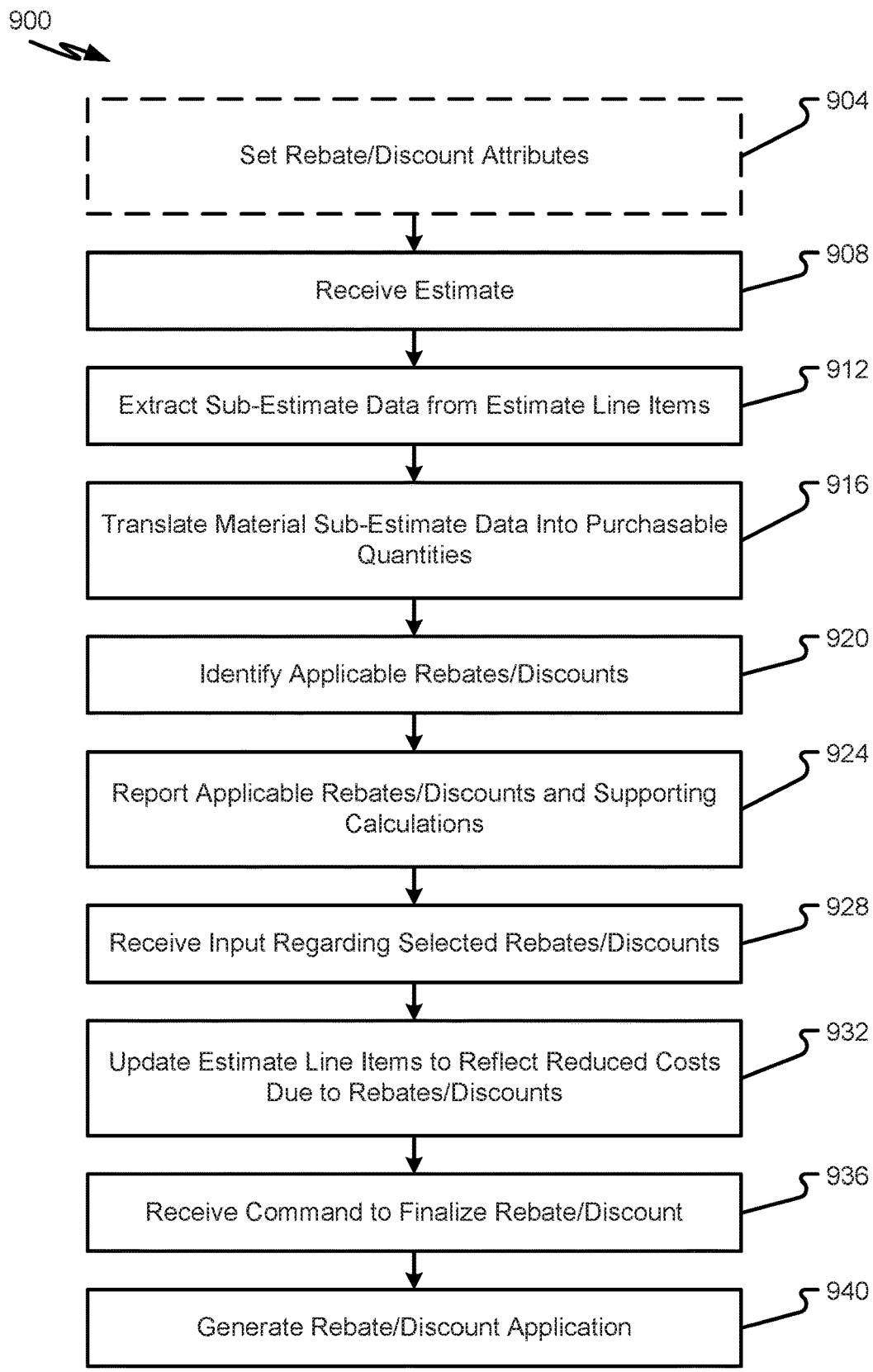
FIG. 9 is a flow diagram depicting a method of identifying applicable rebate programs that may be used in connection with a given estimate according to at least some embodiments of the present disclosure.

Turning now to FIG. 9, a method 900 according to embodiments of the present disclosure comprises setting rebate attributes (step 904). This step may be included in the method 900 only occasionally or optionally, when needed to ensure that the rebate attributes are accurate and current. Setting the rebate attributes may comprise storing information about a particular rebate or bulk discount program in a rebate program database 828. The information stored in the rebate program database 828 may comprise information about the dates during which the program is in effect, the requirements for obtaining a rebate or a bulk discount under the program (including, e.g., the physical location at which materials must be picked up in order to qualify for the program, payment terms that trigger rebates or discounts, regions in which the program is available), the material(s) covered by the program, how returns will be accounted for under the program, different levels or rates of rebates or bulk discounts available under the program, minimum order size, material availability and substitution policies, methods by which a rebate or discount is accrued and/or calculated, the frequency at which rebates will be paid and/or discounts will be provided, any forms that need to be submitted in order to request a rebate or bulk discount, purchasable quantities for the program, and any other information that may be needed by the rebate system to identify applicable rebate programs and/or bulk discount programs, calculate the cost savings available through the program(s), and submit a request for a rebate or bulk discount under the program.

Rebate attributes may be set using a user interface of the rebate system 804, and/or using a communication device 108. The rebate attributes may be set, for example but without limitation, by a representative of an insurance carrier and/or by a representative of an estimator. The rebate attributes may be set in a rebate program database such as the database 828. One or more of the attributes (including, for example, purchasable quantity definitions) may be set in another database such as the purchasable quantity database 824.

The method 900 further comprises receiving an estimate (step 908). The estimate may be received from an estimating system such as the system 112, or from an inspection system, or from a third-party estimating system, or from another source. The estimates may be received via a communication network such as the network 104, and/or via an estimating system interface such as the interface 808. In some embodiments, receiving the estimate comprises reformatting the estimate from a first format (in which the estimate is received) to a second format (in which the estimate can be processed). In some embodiments, more than one estimate can be received at once or in quick succession. Where necessary, received estimates may be held in a queue for reformatting and/or for further processing while another (e.g. a previously received) estimate is reformatted and/or further processed.

Also included in the method 900 is the step of extracting sub-estimate data from estimate line items (step 912). The extraction may be performed, for example, with a line item extraction engine 812. The extraction may comprise identifying line items in the received estimate corresponding to one or more materials, and further identifying from the estimate, for each material type included in the estimate, a needed quantity. While in some embodiments the quantity may be provided as part of the line item (and thus readily available for extraction), in other embodiments the extraction may comprise calculating a quantity based on information included in the estimate (e.g. for an estimate for re-shingling a roof, the amount of tar paper needed may be calculated based on the dimensions of the roof that needs to be re-shingled, which may be provided in the estimate).

Also in some embodiments, the extraction may comprise identifying one or more tasks covered by the estimate, and comparing materials explicitly identified in the estimate with a stored list of materials corresponding to one or more of the identified tasks. If the estimate does not explicitly identify most or all of the materials on the stored list of materials, then the extraction may further comprise comparing line items with a catalog or database of known bundled line items so as to identify materials needed by an estimate but not explicitly identified. For example, an estimate line item for "installation of roof shingles" may have a corresponding entry in a catalog or database indicating that "installation of roof shingles" will require certain materials, such as tar paper, shingles, staples, nails, and flashing. Thus, the extraction may comprise comparing estimate line items with line items in a catalog or database and, when a match is found, associating material-related information in the catalog or database with the line item in question.

In addition to extracting a material type and an associated quantity, extraction in some embodiments of the present disclosure may further comprise, without limitation, extracting location data, material grade, material definition, material recyclability information, and non-material-specific information such as the claim type, insurance carrier, inspector data, and claim number associated with the estimate.

Extracting sub-estimate data from estimate line items in step 912 may further comprise mapping specific line items to information extracted from those line items, as well as information that supplements information extracted from those line items. For example, the system may extract a specific material name from an estimate line item, and supplement that material name with a predetermined minimum material grade obtained from, for example, a material database accessible to the system executing the method 900.

The method 900 further comprises translating material sub-estimate data into purchasable quantities (step 916). A purchasable quantities engine such as the purchasable quantities engine 816 may be used for this step. Additionally, purchasable quantity information may be obtained from a purchasable quantities database 824 and/or from a rebate program database 828. Translating material sub-estimate data into purchasable quantities may comprise comparing needed amounts of materials as extracted from the estimate line items in step 812 with purchasable quantity definitions corresponding to the materials in question that are stored in a database 824 or 828. The translating may further comprise determining whether the needed amounts of materials meet or exceed any of the purchasable quantities associated with available rebate or bulk discount programs, and/or (where purchasable quantities correspond to purchasable units) determining how many purchasable quantities of a given material are included in the needed amount of the given material.

Also included in the method 900 is the step of identifying applicable rebates and/or discounts (step 920). This step may comprise verifying not just that one or more purchasable quantity requirements for a given rebate or discount program are satisfied by one or more needed materials in the estimate, but also verifying that other requirements for the program are or can be met. For example, if a given rebate program applies only to materials picked up in Phoenix, Ariz. or Reno, Nev., then the physical location requirement of that rebate program likely will not and cannot be met for an estimate to repair a damaged property in Pittsburgh, Pa. Where the ability (or inability) to satisfy a particular rebate or discount requirement cannot be determined automatically, the rebate or discount may be reported out with other applicable rebates or discounts, but with an annotation describing the requirement and/or indicating that a determination is still needed regarding the requirement.

The method 900 additionally comprises reporting applicable rebates/discounts and supporting calculations (step 924). For example, applicable rebates and discounts identified in step 920 may be compiled in a list, table, or spreadsheet formatted for visual presentation to a user. The list, table, spreadsheet, or other report may be transmitted via the communication network 104 for display on a communication device 108, sent via email to a predetermined email address, and/or printed in hard copy. The report may include, without limitation, the name of each applicable rebate and discount, the cost savings associated with each, the material(s) covered by each, any applicable limitations for each (e.g. "must be picked up in Phoenix, Ariz.," or "requires full payment within 15 days"), and any calculations performed during the step 920 to determine that the rebate or discount was an applicable rebate or discount. Rebates and discounts related to the same material (e.g. provided by different suppliers of the material in question) may be grouped together in the report to facilitate comparison thereof and selection of one thereof. As noted above, rebates and discounts for which there are requirements that could not be automatically evaluated (e.g. to determine whether the requirements are or could be satisfied) may include an annotation indicating the same, and may be grouped together or otherwise treated differently in the report so as to indicate that the rebate or discount may or may not be applicable. For example, the report may not include a cost savings amount for such rebates and discounts, or the report may include a cost savings amount but may list the rebate or discount at the end of the group to which it belongs (e.g. a group of rebates and discounts covering a particular material), regardless of the criteria used (if any) to rank the remaining rebates and discounts in the group.

In some embodiments, the report may list the applicable rebates and discounts ranked in order of decreasing cost savings, such that the rebate or discount corresponding to the highest cost savings is listed first. Also in some embodiments, the report may list the applicable rebates in different bundles or scenarios based on groupings of rebates and discounts that are not mutually exclusive. For example, some rebates or discounts may be available only if one or more other rebates or discounts are used, while others may be available only if one or more other rebates or discounts are not used. Thus, the report may list mutually compatible rebates and discounts grouped together with a total cost savings for each scenario, to facilitate the selection of a group of rebates and discounts that will provide the greatest cost savings (even if, for example, one or more of the rebates or discounts in the group, standing alone, does not provide the greatest cost savings when compared to other rebates and discounts available for a particular material).

Reports generated in step 924 may be stored in a central database, and may be updated occasionally or periodically. For example, if the rebate or discount calculations used to identify the applicable rebates and discounts provided in the report are based on an estimated purchase quantity for a given material, but the quantity actually purchased is greater than the estimate purchase quantity, then the rebate or discount calculations may be updated to reflect the actually purchased quantity, and the report may be updated to reflect the updated calculations (which may include, for example, updating the report to identify applicable rebates and discounts that were not determined to be applicable based on the original calculations, or to remove rebates and discounts determined to no longer be applicable based on the updated calculations, and/or to adjust the cost savings associated with the applicable rebates and discounts identified in the report to reflect the updated calculations. This may be done before or after one or more of a plurality of applicable rebates and discounts is selected. In other words, if one or more of a plurality of applicable rebates have been selected for use with an estimate, then only the calculations regarding the selected applicable rebates and discounts may be updated. However, if one or more of a plurality of applicable rebates have not been selected, or in some embodiments even if such a selection has occurred, then the report may be updated with respect to all applicable rebates and discounts (including newly identified applicable rebates and discounts). Updating of the report (which may be triggered, for example, by key claim payment events, including supplements or reductions to the payments to the insured or to a contractor) allows the insured or other rebate or discount beneficiary to manage the benefit efficiently without human error or expense throughout the lifecycle of the claim.

In some embodiments, the reporting of applicable rebates/discounts and supporting calculations of step 924 may comprise generating a report in response to a query, request, or other user action. For example, a user may be able to log-in to a system executing the method 900 to view year-to-date incentives for one or multiple estimates, rebate programs, or discount programs. The user may also be able to, by way of example but not limitation, view or make changes to stored rebate or discount attributes, view and modify calculated cost savings for a given rebate or discount program; review and/or modify rebate or discount applications that have been rejected, and/or select one or more of a plurality of applicable rebates and discounts to apply to a given estimate.

The method 900 further comprises receiving an input from a user regarding which rebates and/or discounts to utilize in connection with the estimate (step 928). Such an input may be received via a user interface having connectivity to the processor and/or system that carries out the other steps of the method 900, or it may be received via a communication network such as the communication network 104, e.g. from a computing device 108. The input may identify one or more rebates and/or discounts to utilize. In some embodiments, the input may comprise a selection of a grouping of rebates presented in a report generated in step 924 of the method 900 (e.g. a grouping of rebates that are not mutually exclusive). In other embodiments, the input may comprise a selection of one rebate or discount from each of one or more groups in a report generated in step 924 of the method 900 (e.g. one rebate or discount for each material required by the estimate for which a rebate or discount is available). In some embodiments, particularly where there is only one applicable rebate or discount for each of one or more materials in an estimate, and the processor or system executing the method 900 has automatically determined that the requirements of the rebate or discount are or can be met, no input may be requested or received.

Also included in the method 900 is updating the estimate line items to reflect reduced costs due to selected rebates and/or discounts (step 932). Once one or more applicable rebates and discounts have been selected in step 928 (or when there are no alternative applicable rebates and discounts, such that input selecting from alternative applicable rebates and discounts is not required), the cost savings resulting from the selected rebates and discounts may be factored into the estimate line items, such that the estimate line items reflect a lower cost. In some embodiments, the updated estimate may include both the original cost and the cost when the selected rebates and/or discounts are applied. Also in some embodiments, the updated estimate may include information about any requirements that must be fulfilled in order to obtain the selected estimate or cost (such as, by way of example but not limitation, requirements regarding location of material pick-up, participating stores, payment terms, other purchases that must be made to trigger the rebate, and/or purchasable quantities).

In other embodiments, the estimate line items may be updated to include, for each line item, the original estimated cost as well as the discounted material pricing for each applicable rebate and discount identified in step 920. For example, if no input is received selecting one or more applicable rebates or discounts to use with the estimate, then estimate may be updated to show all applicable rebates and discounts. The updated estimate could then be used by relevant decision-makers to provide at least an initial understanding of which rebates and discounts are available and the amount of savings available therefrom. In some embodiments, the updated estimate of step 932 comprises the report of step 924.

In some embodiments, the step 932 may comprise providing updated estimate line items to the estimating system or other source that provided the original analyzed estimate. In other embodiments, the step 932 may comprise generating a modified estimate including the updated estimate line items, which modified estimate may be transmitted to a computing device 108 or to another destination via the communication network 104. Either or both of the report of step 924 and the modified estimate of step 932 may comprise, for example, a location where the material covered by a given applicable rebate or discount must be purchased, or an agreed-upon price for a specific quantity (or quantities) of the material (or materials) covered by the rebate(s) or discount(s) in question, or contact information and/or instructions that will be needed by the insured, the insured's contractor, or the managed repair vendor to contact the rebate or discount supplier to receive the program benefit. In some embodiments, the report of step 924 may be appended to a modified estimate of step 932.

At some point during the method 900, a command may be received indicating that one or more selected rebates and/or discounts should be finalized (step 936). The command may be received from a user interface having connectivity to the processor or system executing the method 900, and/or from a computing device 108. The command may also be received via a communication network 104, including via email or another electronic communication format. The command may be received in response to a request (including, for example, a request in a report generated during step 924, or an updated estimate generated during step 932). The command may simply be a confirmation that applications for previously selected rebates and discounts should be finalized, or the command may comprise a selection of one or more rebates and discounts from among a plurality of applicable rebates and discounts, together with confirmation that the applications for the selected rebates and discounts should be finalized.

The method 900 also comprises generating a rebate or discount application (step 940). At the insurance company's discretion, key claim payment events, the passage of a predetermined period of time, the issuance of a check for an amount greater than a predetermined minimum amount, and/or a change in claim status may trigger the step 940, or may cause a trigger for the step 940 to be set. For example, any one of the foregoing events may cause a two-week (or any other pre-determined time period) trigger to be set for generating a rebate or discount application. Allowing some time to pass between the event in question and finalization of the rebate or discount application may beneficially allow sufficient time for all receipts and/or other information needed for the rebate or discount application to be collected.

Generating a rebate or discount application may comprise requesting updated information regarding the quantity of materials relevant to the rebate or discount that have been or will be ordered; requesting information needed to complete one or more rebate or discount application forms; requesting receipts (e.g. scanned copies of paper receipts, or copies of electronic receipts) for relevant materials purchased; recalculating and/or checking previous calculations needed to support the rebate or discount application; populating one or more forms based on available electronically stored information (including information provided in response to a request); printing the necessary application forms and/or other paperwork for a given rebate or discount application; and/or electronically transmitting an electronic copy of the rebate or discount application to a recipient. The recipient may be an administrator of the rebate or discount, or the recipient may be the insurance carrier, estimator, contractor, or other beneficiary of the rebate or discount (which recipient may receive the rebate or discount application, for example, to conduct a quality control check of the application, to add additional information or attachments to the application, and/or to transmit the completed application to the proper entity for processing).

According to at least one embodiment of the present disclosure, a would-be beneficiary (e.g. an insured, an estimator, a vendor, an insurance carrier) of a rebate or discount may opt of the rebate or discount program, and a system such as the system 804 for managing rebates may track the rate of such opt-outs, as well as the rate of usage of a given rebate or incentive program. Opting out may be desirable, for example, when materials covered by the rebate program are available only in limited quantities (e.g. after a hurricane or other natural disaster, or do to a supply chain breakdown). Also in some embodiments, a rebate system may be integrated with, or may at least receive communications from (e.g. via the communication network 104) third-party suppliers, such that availability of materials needed to satisfy the estimate (and to qualify for an applicable rebate or discount) may be known and validated ahead of time, prior to applying the rebate, discount, or other incentive to the estimate.

Embodiments of the present disclosure may also track details for when an application for a rebate, discount, or other incentive is rejected by the supplier, manufacturer, or other party providing the rebate, discount, or other incentive. The details may comprise reasons for the rejection, such that the insurer can make additional claim payments to the insured to ensure that the insured is made whole in the event that a rebate or discount program included in an estimate is not utilized. Such tracking may be useful for creating a feedback loop, whereby the insurance company can use tracked data about the acceptance or rejection of rebate or discount program applications together with information about the cost of materials both with and without pricing relief from rebate or discount programs to compile market data regarding the effective pricing of materials. Such data may then be used to adjust pricing at the higher level line item in the future when realigning the components of the individual line items. Historic data points for line item material values may be listed and used.

Although several embodiments of the foregoing disclosure have been disclosed in the context of installation of roofing shingles or other roofing repair, the systems and methods of the present disclosure are not limited to materials needed for roofing repairs. To the contrary, the present disclosure may be used for other types of property damage resulting in an insurance claim. For example, the systems and methods of the present disclosure may be used for rental of equipment such as air movers or dehumidifiers after a water loss. An individual line item (e.g. for "cleanup of water damage") may include labor, equipment rental, tax, overhead, and profit. However, a carrier may negotiate a discount or rebate or other direct referral incentive in which the equipment rental price is reduced over standard pricing, and/or in which the labor for delivering and/or setting up the rented equipment is also discounted or otherwise reduced (e.g. through the provision of a rebate). Thus, the systems and methods of the present disclosure may be used to manage the rebate and discount process in this scenario in substantially the same manner as explained elsewhere herein.

Applicant hereby incorporates by reference herein the entire disclosures of U.S. patent application Ser. No. 14/968,574, filed Dec. 14, 2015; U.S. patent application Ser. No. 14/540,886, filed Nov. 13, 2014; U.S. Pat. Nos. 9,158,869; 8,983,806; and U.S. Provisional Patent Application Ser. No. 61/460,964, filed Jan. 11, 2011.

While illustrative embodiments of the disclosure have been described in detail herein, it is to be understood that the inventive concepts may be otherwise variously embodied and employed, and that the appended claims are intended to be construed to include such variations, except as limited by the prior art.

Moreover, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the description.

What is claimed is:

1. A server for use in a communication system, the server comprising:
   a microprocessor;
   a communication interface; and
   a memory including instructions stored thereon that are executable by the microprocessor, the instructions, when executed, causing the processor to:
      receive, via the communication interface, an estimate comprising at least one line item with an associated cost;

extract data from the at least one line item, the data comprising at least one material and an associated material quantity;

identify, based on the at least one material and the associated material quantity, at least one applicable rebate program from among a plurality of available rebate programs;

translate the extracted material quantity from the extracted material quantity to a purchasable material quantity for the at least one applicable rebate program;

automatically generate a message containing an application form for the at least one applicable rebate program comprising the translated data; and transmit the message comprising the application form via the communication interface.

2. The server of claim 1, wherein the memory stores additional instructions that, when executed by the processor, further cause the processor to:

transmit a request for needed information via the communication interface;

receive the requested needed information via the communication interface; and include the needed information in the application form.

3. The server of claim 1, wherein the memory further stores a database of available rebate programs, the database comprising at least one attribute for each of the available rebate programs.

4. The server of claim 1, wherein the data further comprises at least one of location data, material grade, material definition, and material recyclability information.

5. A communication system, comprising:

an estimating system interface for receiving, from an estimating system, an estimate corresponding to an insurance claim, the estimate comprising one or more line items encompassing one or more needed materials;

a line item extraction engine that extracts information about the one or more needed materials from the one or more line items of the estimate, the extracted information comprising at least a material identifier and a material quantity;

a rebate matching engine that:

identifies, based on at least the material identifier, at least one applicable rebate program from a plurality of rebate programs having attributes stored in a rebate program database;

translates the extracted material quantity from the extracted material quantity to a purchasable material quantity for the at least one applicable rebate program; and automatically generates a message containing an application form for the at least one applicable rebate program comprising the translated data; and an estimator/carrier interface that enables communications with a communication device regarding the applicable rebate programs, wherein the message comprising the application form is transmitted to the communication device.

6. The communication system of claim 5, further comprising a purchasable quantities engine that compares the material quantity to one or more purchasable quantities stored in a purchasable quantities database and determines whether at least one of the one or more purchasable quantities corresponds to the material quantity.

7. The communication system of claim 6, wherein the rebate matching engine further identifies applicable rebate programs based on the material quantity.

8. The communication system of claim 5, wherein the attributes stored in the rebate program database comprise at least one of a minimum order size, availability information, substitution information, a rebate rate, required payment terms, rebate accrual information, rebate calculation information, rebate frequency information, promotional package information, rebate region information, material pick-up location information, return information, rebate limitations information, and purchasable quantity information.

9. The communication system of claim 5, wherein the rebate matching engine generates a report that lists the identified applicable rebate programs.

10. The communication system of claim 5, wherein the rebate matching engine transmits information about at least one of the applicable rebate programs to the estimating system via the estimating system interface.

11. The communication system of claim 5, wherein at least one of the one or more line items in the estimate comprises a bundled line item.

12. The communication system of claim 5, wherein the rebate matching engine compares cost savings information about a plurality of applicable rebate programs and selects an applicable rebate program associated with a greater cost savings than any other applicable rebate program in the plurality of applicable rebate programs.

13. The communication system of claim 5, wherein the rebate matching engine automatically fills out application forms associated with at least one of the applicable rebate programs.

14. A method for identifying applicable rebate programs, the method comprising:

receiving, at a processor and via an interface, an estimate comprising at least one line item with an associated cost;

extracting, with the processor, data from the at least one line item, the data comprising at least one material and an associated material quantity;

identifying, with the processor and based on the at least one material and the associated material quantity, at least one applicable rebate program from among a plurality of available rebate programs;

translating the extracted material quantity from the extracted material quantity to a purchasable material quantity for the at least one applicable rebate program;

automatically generating a message containing an application form for the at least one applicable rebate program comprising the translated data; and transmitting the message comprising the application form via the communication interface.

15. The method of claim 14, further comprising:

updating, with the processor, the associated cost of the at least one line item to reflect a cost savings associated with the at least one applicable rebate program.

16. The method of claim 14, wherein the at least one applicable rebate program comprises a plurality of applicable rebate programs, the method further comprising:

receiving, at the processor and via the interface, an input comprising a selection of one of the plurality of applicable rebate programs.

17. The method of claim 14, further comprising:

receiving, at the processor, a command to finalize the at least one applicable rebate program.

18. The method of claim 17, further comprising:

generating, with the processor and in response to the command, an application for a rebate under the at least one applicable rebate program.

19. The method of claim 18, wherein the generating comprises automatically populating at least one application form with available information.

20. The method of claim 14, further comprising:
storing information about at least one of the plurality of available rebate programs in a rebate program database stored in a memory, the information corresponding to at least one of an effective date of the rebate program, an expiration date of the rebate program, one or more requirements for obtaining a rebate under the rebate program, a material covered by the rebate program, return information corresponding to the rebate program, a rebate rate corresponding to the rebate program; and a minimum order size for the rebate program.

* * * * *